United States Patent
Tamura et al.

(10) Patent No.: US 8,001,723 B2
(45) Date of Patent: Aug. 23, 2011

(54) TOOL, SYSTEM, METHOD, AND PLANT FOR PROMOTING GROWTH OF SEEDLING, SEEDLING SET FOR PLANTING, AND PLANTING METHOD

(75) Inventors: Kazuhisa Tamura, Hyogo (JP); Naoki Ogawa, Hyogo (JP); Wataru Kawamura, Hyogo (JP); Hiromitsu Nagayasu, Hyogo (JP); Takehiko Matsui, Kanagawa (JP); Kinya Fujita, Hyogo (JP); Masatoshi Tamai, Hyogo (JP); Kenichi Katayama, Hyogo (JP); Shinobu Inanaga, Ibaragi (JP)

(73) Assignee: Mitsubishi Heavy Industries, Inc., Tokyo (JP)

( * ) Notice: Subject to any disclaimer, the term of this patent is extended or adjusted under 35 U.S.C. 154(b) by 1148 days.

(21) Appl. No.: 11/350,928

(22) Filed: Feb. 10, 2006

(65) Prior Publication Data
US 2007/0079551 A1 Apr. 12, 2007

(30) Foreign Application Priority Data

Sep. 29, 2005 (JP) ................ 2005-284590

(51) Int. Cl.
*A01G 9/10* (2006.01)
(52) U.S. Cl. .......................................................... 47/77
(58) Field of Classification Search ........... 47/1.01 R, 47/59 R, 63, 32.7, 32.8, 65.7, 66.5, 66.7, 47/73, 74, 77, 84, 58.1 R, 58.1 SE, 58.1 FV
See application file for complete search history.

(56) References Cited

U.S. PATENT DOCUMENTS

| | | | | |
|---|---|---|---|---|
| 3,828,473 A | * | 8/1974 | Morey | 47/58.1 R |
| 4,457,102 A | * | 7/1984 | Ploeger, Jr. | 47/58.1 R |
| 5,829,192 A | * | 11/1998 | Gatliff | 47/58.1 R |
| 7,272,911 B2 | * | 9/2007 | Gatliff | 47/58.1 R |
| 2007/0079551 A1 | * | 4/2007 | Tamura et al. | 47/65.5 |

FOREIGN PATENT DOCUMENTS

| | | |
|---|---|---|
| JP | 60-49722 A | 3/1985 |
| JP | 1-225421 A | 9/1989 |
| JP | 2000-32840 A | 2/2000 |
| JP | 2002-17167 A | 1/2002 |
| JP | 2002017167 * | 1/2002 |
| JP | 2003-102278 A | 4/2003 |
| JP | 2003-125623 A | 5/2003 |
| JP | 2003125623 * | 5/2003 |

(Continued)

*Primary Examiner* — Francis T Palo
(74) *Attorney, Agent, or Firm* — Birch, Stewart, Kolasch & Birch, LLP

(57) ABSTRACT

The present invention is to provide a technology capable of planting seedlings in soil in planting ground such as dry land and allowing the seedling to root securely and grow without artificially supplying water continuously. Not only is a seedling fixed inside an upper opening portion of a tube having a length to a deep water-containing layer in the planting ground but also a growing medium is put inside the tube at a hardness that allows the root of the seedling to grow long downward, and the root of the seedling is allowed to grow below the tube, thereby obtaining the seedling having a long root. A vertical hole having approximately the same diameter as that of the tube is dug in the ground of the planting ground until reaching a soil layer having water quality and water quantity necessary for growth of plant, the seedling having the long root is buried in the vertical hole together with the tube, thereby planting the seedling in the planting ground.

31 Claims, 17 Drawing Sheets

FOREIGN PATENT DOCUMENTS

| | | | |
|---|---|---|---|
| JP | 2003-164229 A | | 6/2003 |
| JP | 2003-235365 A | | 8/2003 |
| JP | 2003235365 | * | 8/2003 |
| JP | 2003-319717 A | | 11/2003 |
| JP | 2004-242604 A | | 9/2004 |
| JP | 2004242604 | * | 9/2004 |
| JP | 2004-275123 A | | 10/2004 |
| JP | 2004-329124 A | | 11/2004 |

* cited by examiner

BASIC UNIT

TOOL, SYSTEM, METHOD, AND PLANT FOR PROMOTING GROWTH OF SEEDLING, SEEDLING SET FOR PLANTING, AND PLANTING METHOD

CROSS-REFERENCE TO RELATED APPLICATIONS

This application is based upon and claims the benefit of priority from Japanese Patent Application No. 2005-284590, filed Sep. 29, 2005, the entire contents of which are incorporated herein by reference.

BACKGROUND OF THE INVENTION

1. Field of the Invention

The present invention relates to a tool that allows seedling to grow in a short period, a system for growth with the use of the tool, and a method for growth. More specifically, the present invention relates to a tool for promoting growth, a system for promoting growth with the use thereof, a method for promoting growth, and a plant for promoting growth that allows seedlings to grow smoothly in a short period even in areas difficult to raise plants as planting ground, for example, dry land, cold desert where the surface layer of the soil is frozen, and salt accumulation area where salt is accumulated in the surface layer of the soil, and further to seedling set for planting and a method for planting seedling.

2. Description of the Related Art

As is well known, the moisture content in the ground in dry land is very low compared with that in other areas easy for greening. The result obtained by measuring the moisture content in the soil with respect to soil depths in Nigeria in Africa in 2000 is shown in FIG. 19. For example, in the land involved, as shown in the figure, the moisture content is little in the soil surface compared with that in the soil equal to or deeper than 30 centimeters where a relatively stable moisture content is found. Accordingly, survival of plants in dry land depends whether roots can reach a deep layer with this stable moisture fast enough.

In salt accumulated soil widely distributed in the world, salt is often contained in a large amount in relatively shallow part (20 centimeters or 30 centimeters deep from the like, there are further points of improvement in respect that water is lost due to evaporation, even though its amount is small, and so forth.

Even in the measures for greening of dry land with the use of plant species having salt resistance, the possibility that organic damage may occur is high and the establishment in the land is difficult in reality even though a plant species having salt resistance is used because of an excessively high salt concentration.

The method for removing salt in soil by washing that is used when there is a rich water source nearby is unrealistic because such a water source cannot be secured in dry land.

In pot culture and open culture that are used as a method for preparation of a seedling used for planting, the time period of raising the seedling is long. On the other hand, when a huge quantity of seedlings can be raised in a short period, this technology can be expected to enhance water conservation and production quantity of seedlings and is very useful for greening project in dry land and cultivation of other plants, vegetables, and the like.

SUMMARY OF THE INVENTION

The present invention has been accomplished in light of such existing circumstances, and the object of the present invention is to provide a technology with which a seedling can be planted smoothly in the soil in a local land of planting ground where utilization of water in the soil surface layer (difficult to secure water necessary for plant raising) in dry land, cold land, areas where salt is accumulated in the surface layer, and the like is difficult and that allows the seedling to root and grow securely without actively supplying water artificially at the planting ground.

As a means for solving the aforementioned problems, the tool for promoting growth of seedling of the present claim 1 is a tool for promoting growth of seedling to obtain a seedling having a long root capable of rooting in planting ground, characterized in that the tool comprises: a tube having a length reachable to a subsurface water-containing layer of the planting ground; and a raising medium filled inside the tube, wherein the raising medium is adjusted to a hardness that promotes the downward growth rate of the root of the seedling fixed inside an upper opening portion of the tube.

Here, a tube has a length reachable to a subsurface water-containing layer of the planting ground means that the tip of the root has a length reachable to the subsurface water-containing layer as a result of the growth of the seedling fixed in the tube and does not necessarily mean that the tube itself has a length long enough to contact the water-containing layer.

Furthermore, an adaptation layer filled with a raising medium at a hardness higher than the hardness of the raising medium filled in the tube is provided in the inside of the lower end of the tube.

Here, the adaptation layer is provided to allow a root of a seedling to grow in a soil at a hardness higher than that of the soil (raising medium in the tube) in which the seedling has been grown, development of lateral roots to be promoted, the root to spread well into the planting soil outside the tube, and the establishment rate to be enhanced.

The tool for promoting growth of seedling according to the present claim 2 is, in the tool for promoting growth of seedling according to claim 1, characterized in that the hardness of the raising medium is equal to or lower than the soil hardness of the planting ground where the seedling is rooted after having grown.

The optimal value of hardness of the raising medium differs depending of plant species, and therefore it cannot be set absolutely. According to the definition of a soil hardness with the use of a value (dry density) obtained by dividing a weight of soil dried for 24 hours at 105.degree. C. by its volume, in a case where the soil hardness for planting soy bean is 1.5 Mgm.sup.−3, the rate of downward elongation of the root can be increased equal to or more than two fold (compared to the case of soil hardness (=1.5 Mgm.sup.−3)) when, for example, the soil hardness is adjusted to 1.35 Mgm.sup.−3. In a case where the soil hardness for planting Japanese black pine is 1.5 Mgm.sup.−3 and when, for example, the soil hardness is adjusted to equal to or lower than 0.5 Mgm.sup.−3, the rate of downward elongation of the root can be increased equal to or more than four fold (compared to the case of soil hardness (~1.5 Mgm.sup.−3)). Like this, the present technology is effective on various plants from herbaceous plants such as soy bean to arboreous plant such as Japanese black pine.

The tool for promoting growth of seedling according to the present claim 3 is, in the tool for promoting growth of seedling according to claim 1, characterized in that the raising medium is at least one kind selected from a group consisting of soil, sand, gravel, and a substitute for soil.

The tool for promoting growth of seedling according to the present claim 4 is, in the tool for promoting growth of seedling according to claim 1, characterized in that the tube has water permeability.

The tool for promoting growth of seedling according to the present claim 5 is, in the tool for promoting growth of seedling according to claim 1, characterized in that the tube has a water holding property.

The tool for promoting growth of seedling according to the present claim 6 is, in the tool for promoting growth of seedling according to claim 1, characterized in that the tube has air permeability.

The tool for promoting growth of seedling according to the present claim 7 is, in the tool for promoting growth of seedling according to claim 1, characterized in that the subsurface water-containing layer is a water-containing layer having water quality and water quantity necessary for growth of the seedling.

As to the water amount in the water-containing layer, although it depends on the geology and plant species, the moisture content is preferably equal to or larger than three percent for growth of a seedling. Further, the water-containing layer may be a subsurface water stream itself. Furthermore, the water quality of the water-containing layer means that, for example, the salt concentration is low, and the salt concentration is equal to or lower than 20 mS/cm in consideration of growth of the seedling. When taking growth of plant species having a low salt resistance into consideration, the salt concentration of the water-containing layer is preferably equal to or lower than 10 mS/cm.

The tool for promoting growth of seedling according to the present claim 8 is, in the tool for promoting growth of seedling according to claim 1, characterized in that the planting ground is soil and the raising medium constituting the adaptation layer is at least one kind selected from the group consisting of soil, sand, gravel, and a substitute for soil.

The tool for promoting growth of seedling according to the present claim 9 is, in the tool for promoting growth of seedling according to claim 1, characterized in that the tube is formed of a biodegradable material.

Here, the biodegradable material means materials that are photodegraded by sunlight, materials that are oxidatively degraded depending on temperature, materials that are hydrolyzed depending on humidity, and materials that are degraded by microorganisms.

The tool for promoting growth of seedling according to the present claim 10 is, in the tool for promoting growth of seedling according to claim 1, characterized in that the planting ground is dry land.

The present claim 12 is directed to a system for promoting growth of seedling to obtain a seedling having a long root capable of rooting in planting ground, characterized in that the system comprises: at least one of the tools for promoting growth of seedling according to claim 1; and a rack member to hold the tool for promoting growth.

The present claim 14 is directed to a system for promoting growth of seedling to obtain a seedling having a long root capable of rooting in planting ground, characterized in that the system comprises: a tank of liquid fertilizer to store liquid fertilizer for the seedling; and a rack member that holds at least one of the tools for promoting growth of seedling according to claim 1 in a state where the lower end of the tool for promoting growth is immersed at least temporarily in the liquid fertilizer in the tank of liquid fertilizer.

The system for promoting growth of seedling according to the present claim 15 is, in the system for promoting growth of seedling according to claim 14, characterized in that the rack member has an up-and-down unit that moves the tool for short growth up and down with respect to the tank of liquid fertilizer.

The system for promoting growth of seedling according to the present claim 16 further comprises, in the system for promoting growth of seedling according to claim 13, an aerating unit that increases the amount of dissolved oxygen in the liquid fertilizer by forcibly dissolving air in the liquid fertilizer in the tank of liquid fertilizer.

The system for promoting growth of seedling of the present claim 17 is a system for promoting growth of seedling to obtain a seedling having a long root capable of rooting in planting ground, characterized in that the system comprises: a rack member to hold at least one of the tools for promoting growth of seedling according to claim 1; and a liquid fertilizer supply unit that supplies liquid fertilizer in a dripping state to the upper end of each of the tools for short growth.

The present claim 18 is directed to a method for promoting growth of seedling to obtain a seedling having a long root capable of rooting, in planting ground, characterized in that the method comprises: fixing a seedling inside an upper opening portion of a tube having a length reachable to a subsurface water-containing layer of the planting ground; filling a raising medium inside the tube at a hardness that promotes the downward growth rate of the root of the seedling; and promoting the downward growth of the root of the seedling from the tube, thereby obtaining the seedling having the long root.

Furthermore, the method for promoting growth of seedling is characterized in that an adaptation layer is provided by filling a raising medium inside the lower end of the tube at a hardness higher than the hardness of the raising medium filled in the tube.

The present claim 19 is, in the method for promoting growth of seedling according to claim 18, characterized in that the hardness of the raising medium is set to a hardness equal to or lower than the soil hardness of the planting ground where the seedling is rooted after having grown.

The present claim 20 is, in the method for promoting growth of seedling according to claim 18, characterized in that at least one kind selected from a group consisting of soil, sand, gravel, a substitute for soil is used as the raising medium.

The present claim 21 is, in the method for promoting growth of seedling according to claim 18, characterized in that the tube is formed of a water permeable material for facilitating water supply to the root of the seedling.

The present claim 22 is, in the method for promoting growth of seedling according to claim 18, characterized in that the tube is formed of a water retaining material for facilitating water supply to the root of the seedling.

The present claim 23 is, in the method for promoting growth of seedling according to claim 18, characterized in that the tube is formed of an air permeable material for facilitating oxygen supply to the root of the seedling.

The present claim 23 is, in the method for promoting growth of seedling according to claim 18, characterized in that a water-containing layer having water quality and water quantity necessary for growth of the seedling is selected for the water-containing layer.

A length in which the plant in the planting ground can reach a water-containing layer having water quality and water quantity necessary for growth of plant in the planting ground is determined by conducting geological survey in advance and then utilizing the measurement results and the like.

The present claim 25 is, in the method for promoting growth of seedling according to claim 18, characterized in that, when the planting ground is soil, at least one kind selected from the group including soil, sand, gravel, and a substitute for soil is used as the raising medium constituting the adaptation layer.

The present claim 26 is, in the method for promoting growth of seedling according to claim 18, characterized in that, when the root of the seedling fixed in the upper end of the tube grows inside the tube to extend the tip of the root further below from the lower end of the tube, root pruning treatment is carried out at the tip of the root, thereby promoting development and elongation of lateral roots from the tip of the root grown inside the tube.

The present claim 27 is, in the method for promoting growth of seedling according claim 18, characterized in that the planting ground is dry land.

The present claim 30 is directed to a plant for promoting growth of seedling, characterized in that the plant comprises: a space where climatic environment is controllable; the system for promoting growth according to claim 12 provided in the space; and a moving unit that moves the system for promoting growth in the space.

The present claim 11 is directed to a seedling set for planting, characterized in that the set comprises a seedling having a long root reaching the lower end of the tool for promoting growth according to claim 1 that is inserted into the tool for promoting growth.

The present claim 13 is, in the seedling set for planting according to claim 12, characterized in that the seedling having the long root is raised with the use of the system for promoting growth.

The present claim 28 is, in the seedling set for planting according to claim 18, characterized in that the seedling having the long root is raised with the method for promoting growth.

The present claim 29 is, in the seedling set for planting according to claim 18, characterized in that the seedling having the long root is raised in the plant for promoting growth.

The present claim 31 is directed to a method for planting seedling, characterized in that the method comprises: digging a vertical hole in the ground of planting ground until reaching a water-containing layer having water quality and quantity necessary for growth of plant; and burying the seedling set for planting according to claim 11 in the vertical hole, thereby planting the seedling in the planting ground.

Note that when the vertical hole is dug to have approximately the same diameter as the tube diameter of the tool for promoting growth of seedling, fixation of the tool for promoting growth is easy.

The tool for promoting growth, the system promoting growth, and the method for promoting growth, further the plant for promoting growth of seedling, the seedling set for planting, and the planting method at planting ground can allow a seedling having a long root to grow effectively in a short period. Moreover, the long root can be delivered while protected by the tube, and therefore, after the long root is allowed to grow in a place preferable for raising before being buried in the ground, the obtained seedling can be supplied to even a remote area with ease. The seedling transferred to a planting ground is inserted into the ground together with the tube and the raising medium according to the planting method at planting ground of the present invention, in other words, the seedling set for planting of the present invention is inserted into the ground, thereby the tip of the long root reaches the soil layer having water quality and water quantity necessary for plant growth or a subsurface water stream. Therefore, the plant is allowed to root in the planting ground without supplying water actively. By filling the raising medium at a hardness that allows to increase the downward growth rate of the root of the seedling in the inside of the tube, a healthy seedling can be grown in a short period. In addition, by raising the seedling in the tube, the amount of water evaporation can be decreased, thereby making it possible to decrease significantly the water amount necessary for growing.

As described in the foregoing, the technology of raising seedling according to the present invention is different from conventional technologies, capable of raising a seedling having a long root without being restricted by location, and excellent in mass productivity. Further, according to the present invention, since root growth is confirmed and then planting can be carried out, the seedling can be securely planted and the establishment rate can be increased. Therefore, according to the present invention, even if a location is dry land, cold land and other places of which soil surface is generally not suitable for plant growth, for example, polluted soil by salt or other things, greening can be carried out with ease as long as there is a water-containing layer having water suitable for plant growth in the underground. Suppose when the amount of water in the deep soil layer of a planting ground is insufficient for an amount of water necessary for plant growth, subsurface irrigation is carried out with the use of a fine tube (irrigation pipe) provided in the inside of the tube, thereby suppressing evaporation of water and making it possible to decrease the volume of irrigation water significantly compared with ordinary drip irrigation (supply to the aboveground part).

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, examples of a tool for promoting growth of seedling, a system for promoting growth of seedling, a method for promoting growth of seedling, a plant for promoting growth of seedling, a seedling set for planting, and a planting method at planting ground according to the present invention are explained in detail based on the drawings. Note that the examples shown below are mere exemplification to explain the present invention properly and do not limit the present invention at all.

Example 1

Figure 1:
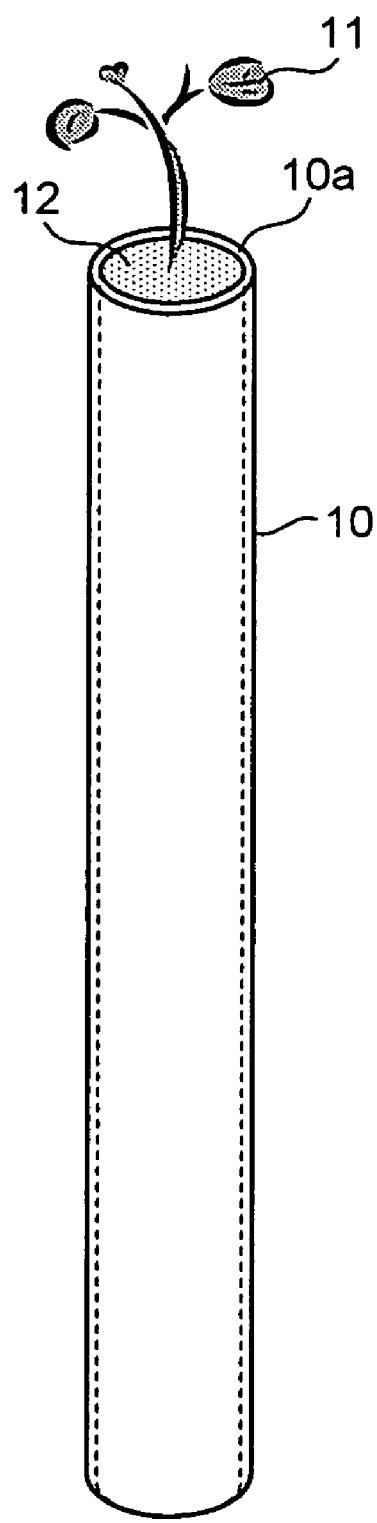
FIG. 1 is a perspective view of a tube (root cylinder) fixed with a seedling according to the present invention.

FIG. 1 is a diagram to explain an example 1 of the present invention and represent a structure of a tool for promoting growth of seedling according to the present invention. A purpose of use of this tool for promoting growth is to grow a seedling having a long root capable of reaching a soil layer where an amount of water necessary for plant growth can be obtained, because, in an area such as dry land that is regarded as difficult to grow plant, salt is often present in a layer relatively shallow from the ground surface, salt accumulation occurs when irrigation is carried out using water containing salts, and an amount of water necessary for plant growth cannot be obtained unless the root reaches the soil layer deep in the ground.

For that purpose, this tool for promoting growth includes a tube (hereinafter, referred to as root cylinder) 10 having a length reachable to a water-containing layer deep in planting ground and a raising medium 12 filled in the root cylinder 10 at a hardness that allows to increase a downward growing rate of a root of a seedling 11 that is fixed inside an upper opening portion of the root cylinder 10. The hardness of this raising medium 12 in the root cylinder 10 is adjusted to equal to or lower than the soil hardness of the planting ground. When a hardness is represented by the dry density described above, and in a case where the soil hardness of planting ground for soy bean was 1.5 Mgm.sup.−3, a rate of downward elongation of the root could be increased equal to or more than two fold (compared to the case of planting soil hardness (=1.5 Mg m.sup.−3)) when the soil hardness was adjusted to 1.35 Mgm.sup.−3, and the rate of downward elongation of the root could be increased equal to or more than five fold (compared to the case of planting soil hardness (=1.5 Mgm.sup.−3)) when the soil hardness was adjusted to equal to or lower than 0.5 Mg m.sup.−3. In other words, the hardness of this raising medium 12 in the root cylinder 10 is preferably as low as possible.

The root cylinder 10 may be a cylinder, and its mouth shape may be polygon such as triangle and square, or elliptic. The root cylinder has open upper and lower ends and may have any mouth shape as long as the raising medium 12 can be put in its inside. Further, the length of the root cylinder may be made to a predetermined length by connecting a plurality of the tubes. The bore diameters of the root cylinder (upper and lower) are preferred to be uniform. The bore diameter of the root cylinder is preferably set to a minimum diameter within a range where the root elongation is not inhibited and an amount for retaining nutrients and water necessary for plant growth can be secured. When the bore diameter of the root cylinder is set too small, there will be possibility that the root elongation is inhibited by influence of the wall surface, and when the bore diameter is set too large, the weight and the volume become large, thereby reducing the operability. The optimal bore diameter of the root cylinder differs depending on plant species and is preferably set generally about 20 fold the diameter of the main root of a seedling.

For the material forming this root cylinder 10, materials having water permeability, a water holding property, and air permeability are preferred. Inorganic and organic porous materials can be used as such a material. The inorganic porous material includes porous sintered body obtained by sintering dried sludge particles and the like, and the organic porous material includes hard foam formed of synthetic resin and the like. Further, this root cylinder 10 is inserted into the ground together with the seedling 11 at the time of actual planting of the seedling 11 as described later and left as they are, and therefore a biodegradable material that is degraded with time to become part of the soil is preferred. This is because not only is the environment conserved but also the tube does not restrain the growth when the seedling 11 grows thickly.

The length of this root cylinder 10 depends on the moisture content in the depth direction of the layer in the area where the seedling 11 is planned to be planted and is effective when it is set to the depth from the soil surface for planting at which water quality and water quantity necessary for plant growth are present. Note that it is not necessarily essential to set the length of the root cylinder 10 to the exact depth up to the water-containing layer. This is because the root that has grown in the root cylinder 10 is capable of growing further downward from the lower end of the root cylinder 10 even though the root cylinder 10 is short to some extent.

The raising medium 12 allows the seedling 11 to be inserted in the inside of the root cylinder 10 or to be fixed inside an upper opening portion 10a in a state that the stem portion and the root of the seedling 11 are protected and is formed of a material having water permeability, a water holding property, and air permeability to allow oxygen supply. Such a material includes soil, sand, gravel, vermiculite, perlite, synthetic resins in a sponge form, and the like.

It is important to adjust the hardness of the raising medium 12 to a hardness that allows to increase the growth rate of the root of the seedling 11 when the raising medium 12 is put all over the inside of the root cylinder 10, and such a hardness is equal to or lower than the soil hardness of the planting ground. The hardness of this raising medium 12 in the root cylinder 10 is preferably as low as possible.

Figure 2:
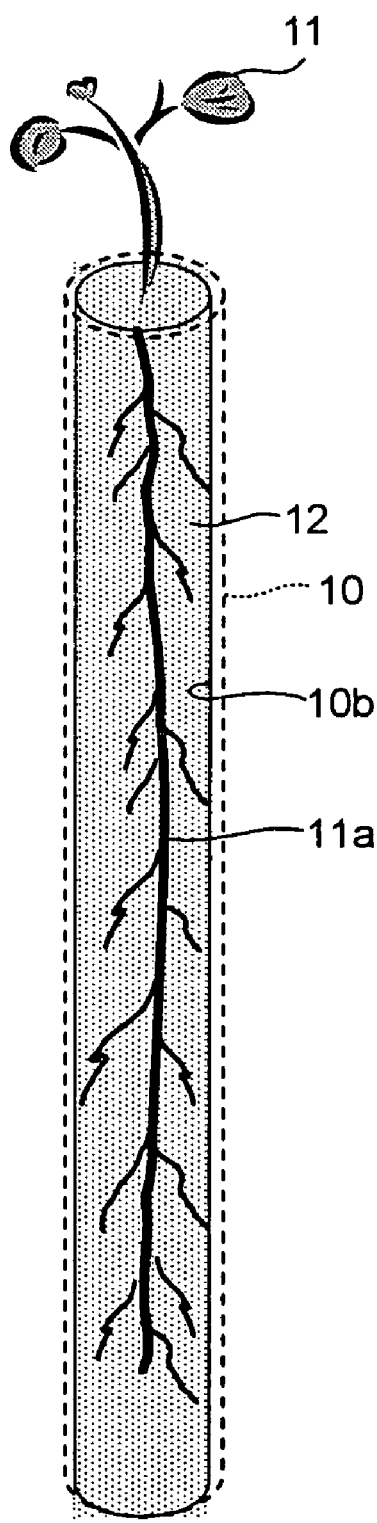
FIG. 2 is a diagram for showing a relation between the inside of the tube (root cylinder) shown in FIG. 1 and roots of the seedling therein.

The seedling 11 is fixed in the tool for promoting growth in such a structure, and a root 11a of the seedling 11 is allowed to grow in the longitudinal direction in an inside 10b of the root cylinder 10 as shown in FIG. 2 by supplying water and oxygen via the root cylinder 10. Since the hardness of the raising medium 12 that is put in the inside 10b of the root cylinder 10 is adjusted to a hardness that allows to increase the growth rate of the root 11a of the seedling 11, the root 11a grows downward rapidly. At this time, when the amount of water to be supplied to the root 11a of the seedling 11 is set to bare minimum, in other words, when water stress is given, the seedling 11 grows the root 11a to the direction where water is present at a speed faster than that when the seedling 11 is placed in an environment rich in water. Accordingly, when the root cylinder 10 is placed in a wet condition by allowing the lower end of the root cylinder 10 to contact water, dripping water continuously to the upper end portion of the root cylinder 10, and so forth, the seedling 11 grows the root 11a downward faster as if the seedling 11 sensed that a water source is present below the root cylinder 10. As a result, raising a seedling having a long root is possible in a short period. Further, since the density of the raising medium 12 in the root cylinder 10 is set low, the total weight of the root cylinder 10, the seedling 11, and the raising medium 12 is very light, the seedling 11 can be easily delivered together with the root cylinder 10 regardless of time in the middle of raising the seedling 11 or after the raising. Note that it is possible to further promote planting of seedlings in an area difficult for planting of plants by supplying a set of "the root cylinder 10, a seedling 11, and the raising medium 12" that is a mode advantageous for this delivery and planting as a seedling set for planting.

Example 2

Figure 3:
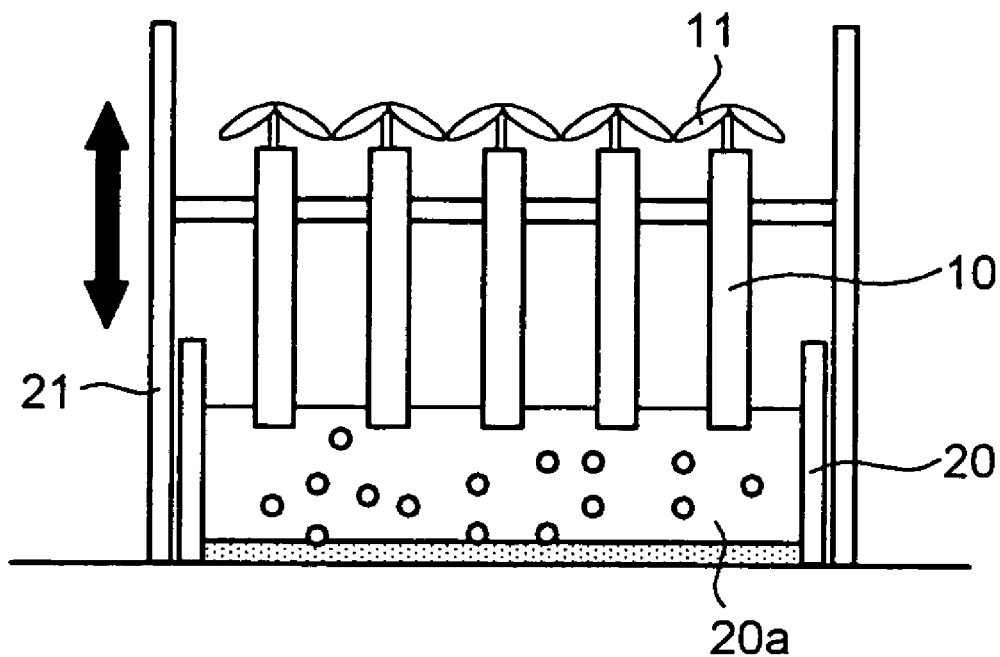
FIG. 3 is a diagram for showing a schematic structure of a system for promoting growth using a tank of liquid fertilizer according to the present invention.

FIG. 3 is a diagram to explain an example 2 of the present invention and represents a first structure of the system for promoting growth of seedling that allows a number of the seedlings 11 to grow at a time using a number of the root cylinders 10 shown in the example 1. This system for promoting growth of seedling includes a tank of liquid fertilizer 20 that stores a liquid fertilizer 20a for seedling therein and a rack member 21 that holds a plurality of the root cylinders 10 in a state where their lower ends are at least temporarily immersed in the liquid fertilizer 20a in the tank of liquid fertilizer 20. With this system for promoting growth, a number of seedlings are raised, but a few seedlings or even one seedling can be used and possibility of growing the seedling effectively is not changed.

The rack member 21 has an up-and-down unit (not shown in the figure) that moves a plurality of the root cylinders 10 up and down with respect to the tank of liquid fertilizer 20. On the other hand, the tank of liquid fertilizer 20 is provided with an aerating unit (not shown in the figure) that increases the amount of dissolved oxygen in the liquid fertilizer 20a by forcibly dissolving air in the liquid fertilizer 20a in the tank of liquid fertilizer 20. The reason for providing the up-and-down unit to the rack member 21 is that when the root cylinder 10 is immersed in the tank of liquid fertilizer at all times, the roots become rotten. By the up-and-down unit, the lower tip portion of the root cylinder is temporarily immersed in the tank of liquid fertilizer for a certain time and allowed to absorb the liquid fertilizer, followed by lifting it again to drop excess water by gravity.

Example 3

Figure 4:
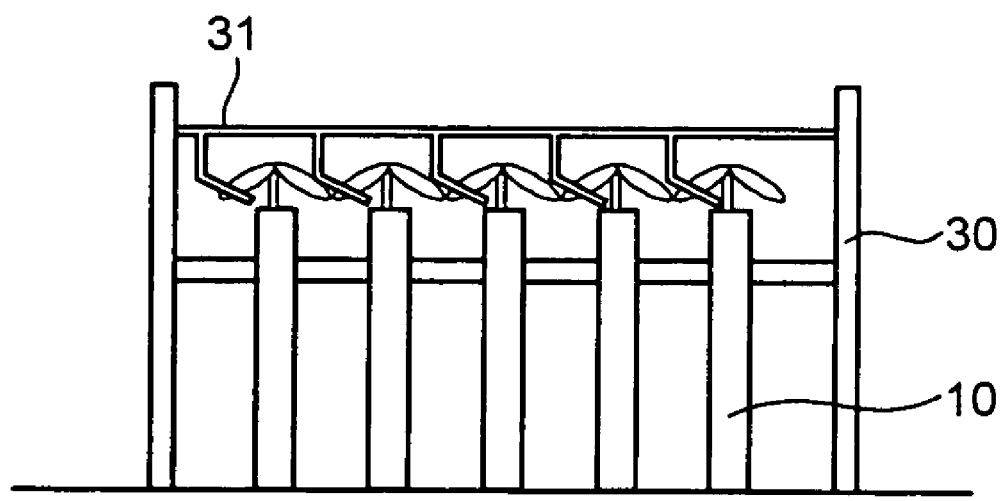
FIG. 4 is a diagram for showing schematic structure of the system for promoting growth using a liquid fertilizer drip supply unit according to the present invention.

FIG. 4 is a diagram to explain an example 3 of the present invention and represents a second structure of the system for promoting growth of seedling that allows a number of the seedlings 11 to grow at a time using a number of the root cylinders 10 shown in the example 1. This system for promoting growth of seedling includes a rack member 30 that holds plurality of the root cylinders 10 and a liquid fertilizer supplying unit 31 to supply liquid fertilizer to the upper end of each root cylinder 10 in a dripping condition.

In such structure, an effect similar to that by the system of the example 2 can be obtained. Further, in this system, supply of nutrients to the root cylinders 10 is carried out from the upper ends of the root cylinders 10, respectively, and therefore, evaporation of water supplied to the root cylinders 10 can be limited mainly to the upper end surface when coating capable of preventing water from being evaporated is applied on the outer surfaces of the root cylinders 10 used for this system, thereby making it possible to save the supply of the liquid fertilizer significantly. The coating material is preferably a material such as vinyl sheet or aluminum foil capable of preventing water from being evaporated as well as easy to attach and detach. Note that when the roots grow into the ground, supply of water to the upper portions of the root cylinders is unnecessary. In this case, it is effective to carry out subsurface irrigation, thereby making it possible to reduce the amount of evaporation from the ground surface.

Example 4

Figure 5:
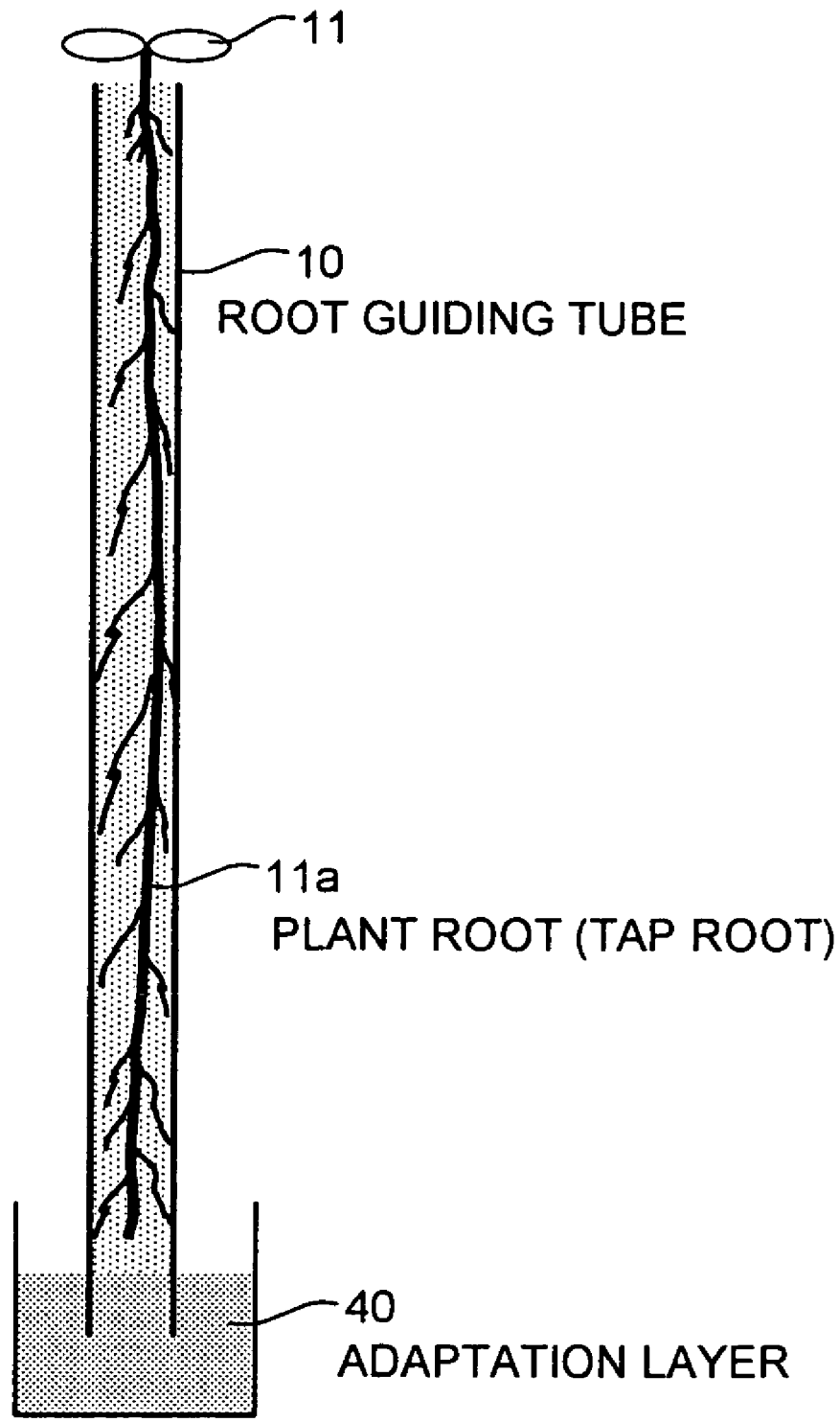
FIG. 5 is a cross-sectional structural diagram of the root cylinder formed with an adaptation layer at the lower end to adapt a long root after having grown to soil of rooting ground.

FIG. 5 is a diagram to explain an example 4 of the present invention and represents the root cylinder 10 provided with an adaptation layer 40 inside the lower end thereof. The adaptation layer 40 is composed by filling a soil material inside the lower end of the root cylinder 10 at a certain hardness higher than the hardness of the raising medium filled in the root cylinder 10 in which the seedling 11 is inserted. The reason for providing the adaptation layer 40 is that when the root 11a of the seedling 11 reaches the lower end of the root cylinder 10 and the growth reaches a state suitable for planting as shown in the figure, development of lateral roots is promoted in advance and the root spread to the planting soil outside the root cylinder 10 is made enhanced such that the root 11a can endure an actual soil difficult for planting seedlings and grow. In the procedures, the adaptation layer 40 is provided inside the lower end of the root cylinder 10 by filling a soil material at a hardness as high as that of the soil where the seedling 11 is rooted before the root 11a of the seedling 11 reaches the lower end of the root cylinder 10, and the tip of the root 11a having grown inside the root cylinder 10 is allowed to grow into the adaptation layer 40. Thereby, the growth of the lateral roots can be promoted before transplanting to the relatively hard soil such as dry land where the seedling 11 is rooted. As a result, the root spread to the planting soil becomes better and the establishment rate of the seedling can be improved.

Example 5

Figure 6:
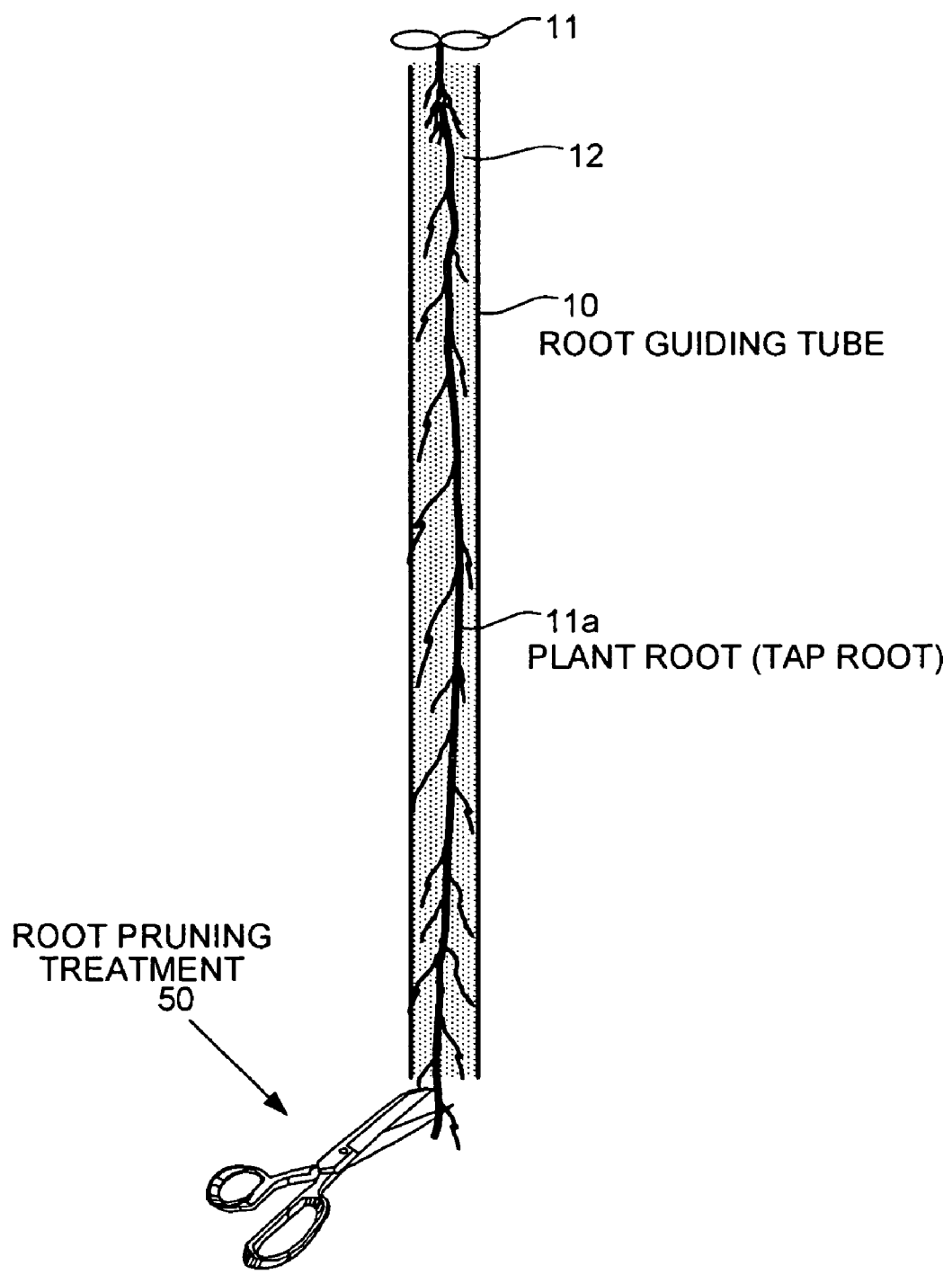
FIG. 6 is a diagram for showing a state where root pruning treatment to promote development of lateral roots for rooting of the long root after having grown in the soil of the rooting ground is being carried out.
Figure 8:
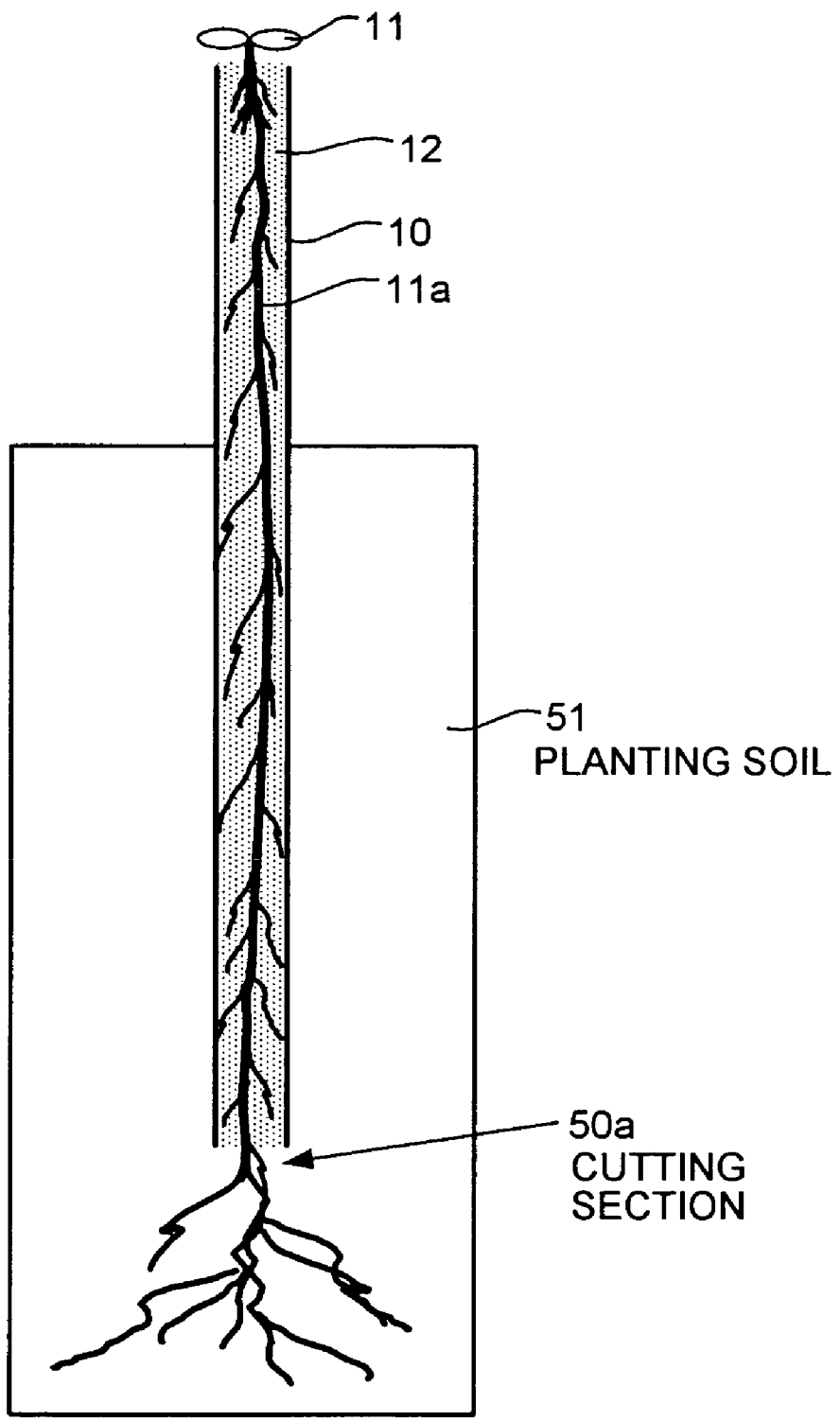
FIG. 8 is a diagram for showing a state where the seedling grows the lateral roots into the planting soil of the planting ground by the root pruning treatment shown in FIG. 6.

FIG. 6 is a diagram to explain an example 5 of the present invention and represents a state where the seedling 11 that has grown to expose the root 11a from the lower end portion of the root cylinder 10 is under root pruning treatment. The method for promoting growth of seedling shown by the present example 5 is featured in that the tip of the root 11a exposed from the lower end of the root cylinder 10 is cut (root pruning treatment 50). Of the root 11a, development and elongation of lateral roots can be promoted by suppressing the dominant growth of the tip portion, so-called apical dominance. The root 11a having undergone the root pruning treatment 50 is easy to develop lateral roots, and when the root 11a is buried in a soil 51 (planting soil) for planting seedling, lateral roots begin to extend to the surrounding soil from a cutting section 50a resulted from the root pruning treatment 50 as shown in FIG. 8. As a result, the establishment into the soil for planting seedling 51 is further promoted. The soil is not soil of the planting ground but may be an artificial raising medium.

Example 6

Figure 7:
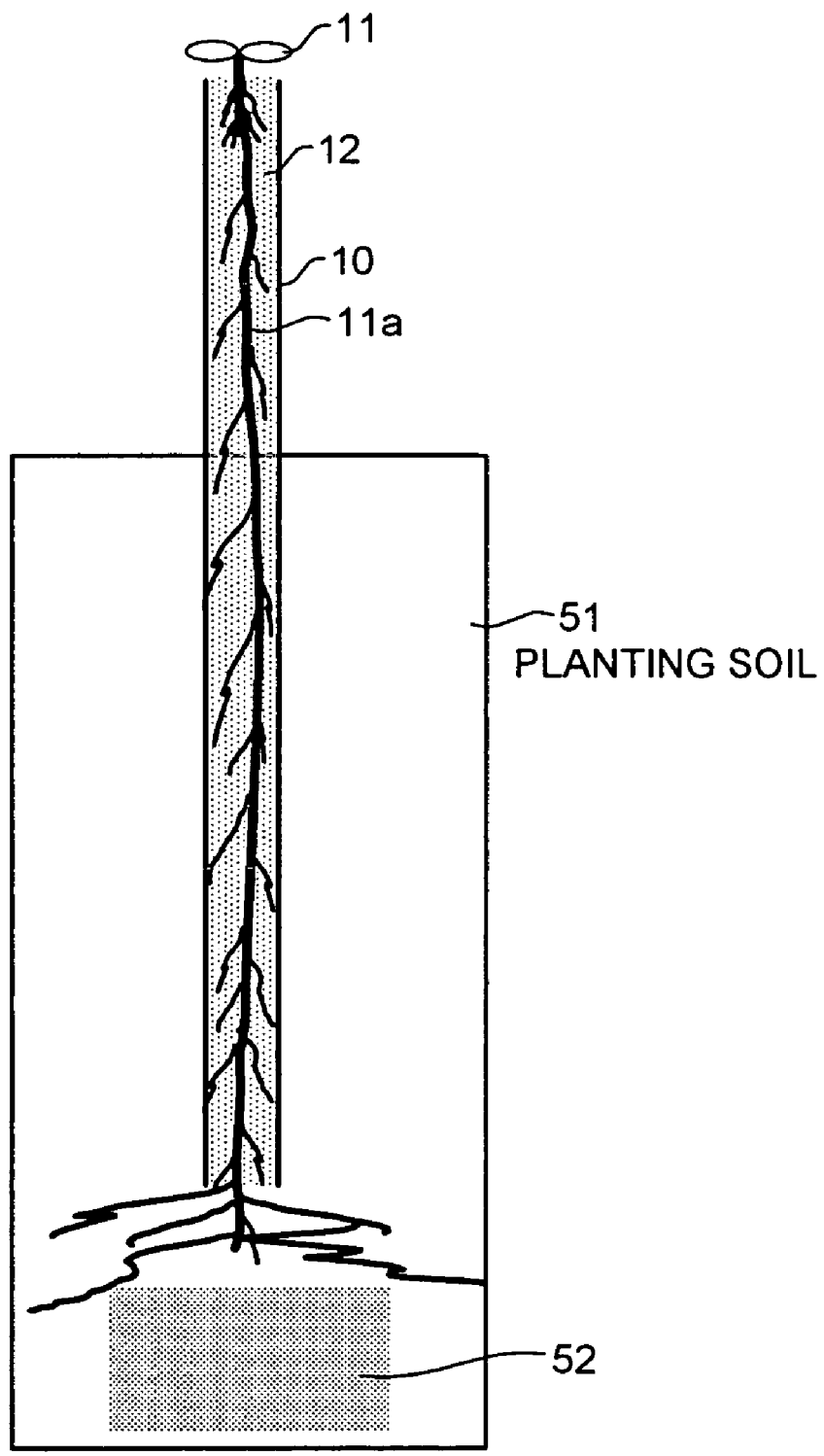
FIG. 7 is a diagram for showing a state where a hard object is arranged in the soil below the lower end of the tube (root cylinder) to promote development of lateral roots for rooting of the long root after having grown into the soil of the rooting ground.

FIG. 7 is a diagram to explain an example 6 of the present invention and represents a state where an object 52 hard enough to hamper the root elongation is placed in the soil below the growing tip of the seedling 11 of which root 11a has grown to expose from the lower end portion of the root cylinder 1.0. The method for promoting growth of seedling shown by the present example 6 is featured in that the elongation of the tip of the root 11a exposing from the lower end of the root cylinder 10 is hampered to develop lateral roots and that the developed lateral roots is allowed to grow. As to the root 11a, it is possible to develop lateral roots and promote their elongation by suppressing the dominant growth of the tip portion of the root 11a, that is, so-called apical dominance by the hard object 52. The root 11a having undergone the root pruning treatment 50 is easy to develop lateral roots and begins to extend the lateral roots in the surrounding soil so as to avoid the hard object 52. As a result, the establishment to the soil for planting seedling 51 is promoted. The soil is not the soil of the planting ground but may be an artificial raising medium.

Example 7

The present example 7 was carried out to confirm that a seedling having a long root could be obtained in a short period when the seedling was grown with the use of the root cylinder. A number of the identical kind of seedlings in approximately the same size were prepared and these were divided into two groups. The seedlings in one group were grown in the sand of Tottori sand dune (1.5 Mgm.sup.−3) arranged as the planting soil, and the seedlings in the other group were grown using root cylinders filled with the raising medium of which hardness was adjusted (the hardness was adjusted to equal to or lower than that of the planting soil (sand of Tottori sand dune)) of the present invention. The plant species used are soy bean (herbaceous plant) and Japanese black pine (arboreous plant).

Figure 9:
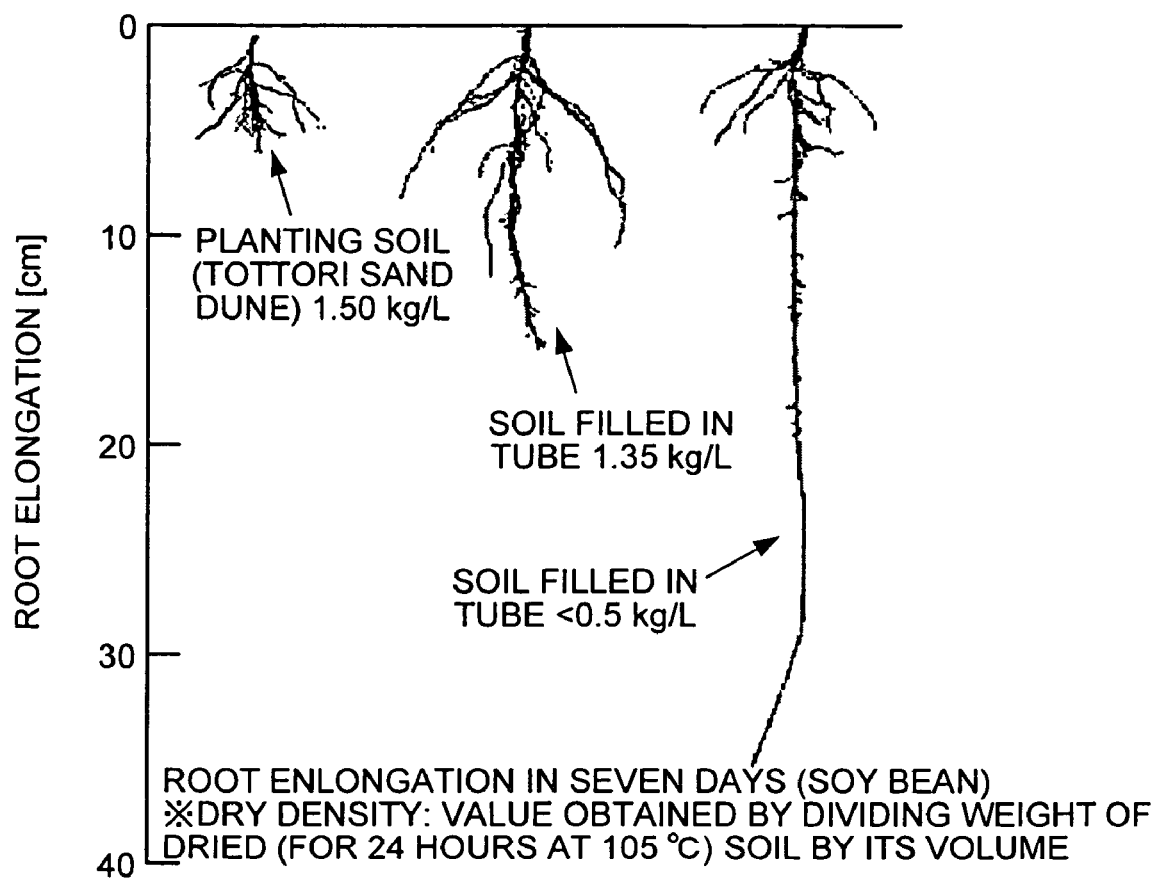
FIG. 9 is a graph for showing growth rate of a long root (soy bean) obtained by a method for promoting growth of seedling according to the present invention.
Figure 10:
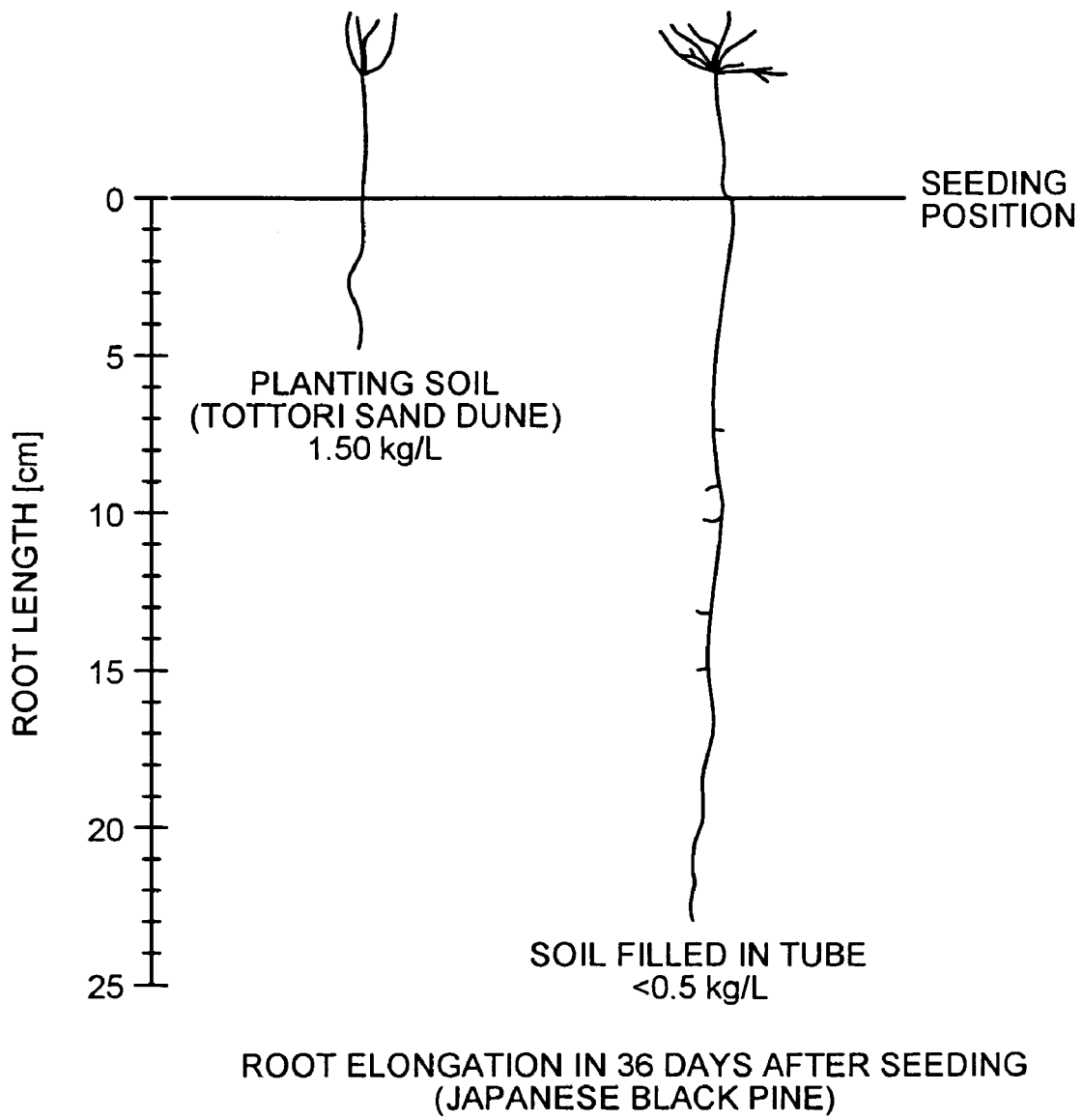
FIG. 10 is a graph for showing growth rate of a long root (Japanese black pine) obtained by the method for promoting growth of seedling according to the present invention.

The raising with the use of the root cylinder was carried out by arranging the system for growth shown in FIG. 4 at the same place. The raising period for soy bean was seven days and for Japanese black pine was thirty-six days. The lengths of the tap roots of the seedlings after raising in each group were measured, respectively, and a mean value of each group was computed. The results are shown in the graphs of FIGS. 9 and 10. In the present test, the moisture in the soil was controlled only in the initial stage, and irrigation was not carried out. A root cylinder having a bore diameter (inner diameter) of eight centimeters was used.

As shown in FIG. 9, the length of elongation of the tap root of soy bean was about eight centimeters when raised in Tottori sand dune (soil hardness 1.50 Mgm.sup.−3) arranged as planting soil, whereas the length of elongation of the tap root reached about 37 centimeters when raised according to the method for promoting growth of the present invention using the root cylinder filled with the raising medium of which hardness was adjusted (<0.5 Mgm.sup.−3). Further, as shown in FIG. 10, the length of elongation of the tap root of Japanese black pine was about five centimeters when raised in the planting soil (Tottori sand dune), whereas the length of elongation of the tap root reached about 23 centimeters when raised according to the method for promoting growth of the present invention with the use of the root cylinder filled with the raising medium of which hardness was adjusted (<0.5 Mgm.sup.−3). Accordingly, with soy bean (herbaceous plant) and Japanese black pine (arboreous plant), it is understood that when the method for promoting growth of the present invention is used, the number of days taken to raise a seedling having a long root capable of rooting in an area difficult to raise plants such as dry land can be shortened to equal to or smaller than one fourth compared with the days taken when an ordinary raising method is used.

Example 8

Figure 11:
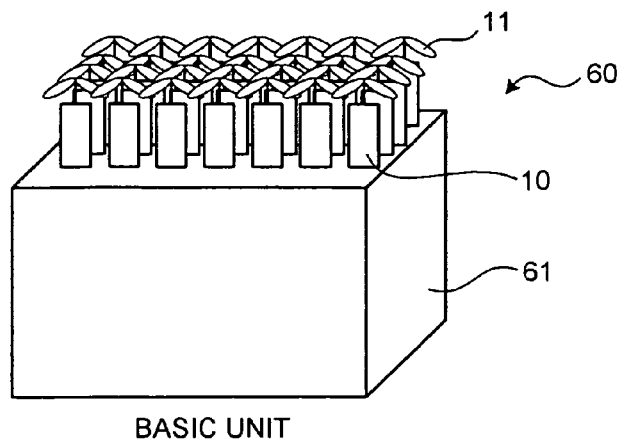
FIG. 11 is a diagram for showing a basic unit suitable for carrying out the method for promoting growth of seedling of the present invention.

FIG. 11 is a schematic diagram of a basic raising unit 60 when the method for promoting growth of seedling of the present invention is performed in a plant scale. This basic unit 60 includes a holding unit 61 in which several tens of the root cylinders 10 per unit are fixed with regular space in-between. This unit 60 is moved to a water supply spot by a delivery unit such as belt conveyor to be supplied with water regularly. This is repeated to complete the raising. When the raising is completed, this basic unit is delivered to an actual location for planting seedling as it is, followed by carrying out work of planting seedling.

Example 9

Figure 12:
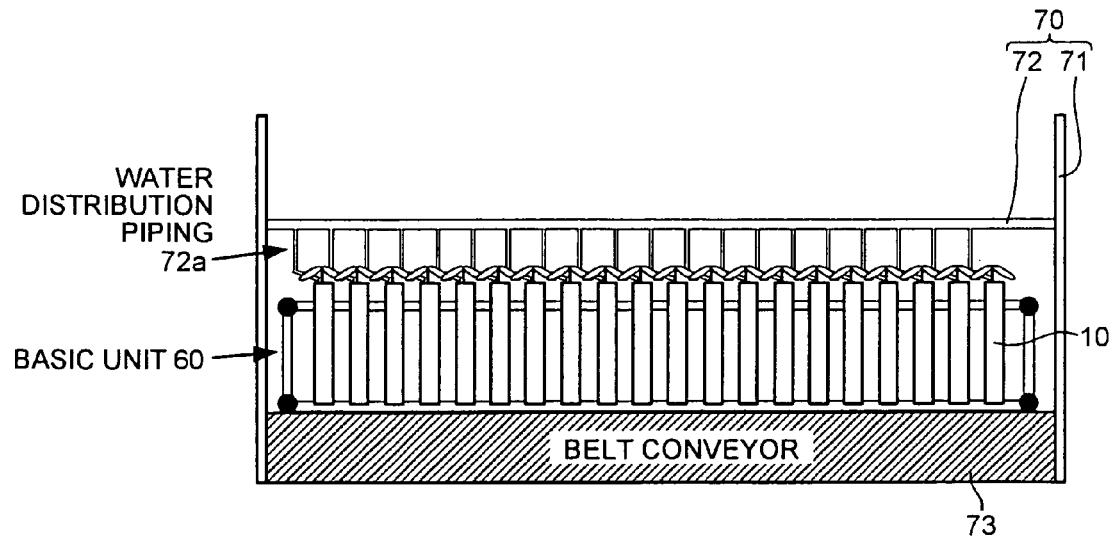
FIG. 12 is a diagram for showing an example of liquid fertilizer supply unit suitable for carrying out the method for promoting growth of seedling of the present invention.

FIG. 12 represents one configuration of the water supply spot. This water supply spot 70 includes a rack member 71 and a liquid fertilizer drip supply unit 72 fixed to this rack member 71. The rack member 71 is a member in a gate form, and a belt conveyor 73 runs under this rack member. The belt conveyor delivers the basic unit 60. When the basic unit 60 is moved to the water supply spot 70 by the belt conveyor 73, it is placed in a stationary state for a predetermined time. During this time period, liquid fertilizer is dripped to the upper end of each root cylinder 10 from each water distribution piping 72a of the liquid fertilizer drip supply unit 72.

Example 10

Figure 13:
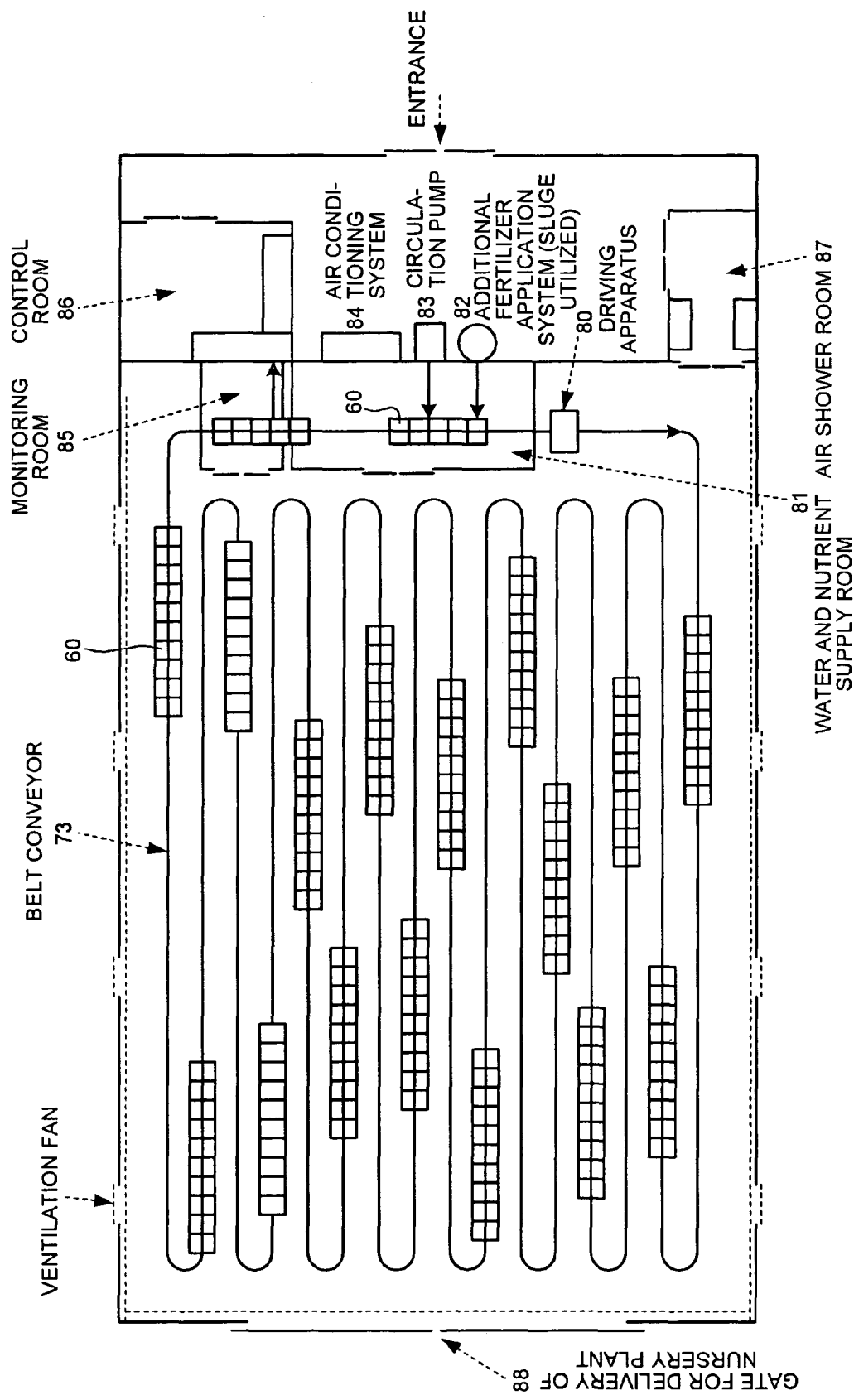
FIG. 13 is a schematic structural diagram of a plant for raising seedling adopting the liquid fertilizer supply unit shown in FIG. 12 in a plant scale.

FIG. 13 is a sketch of the entire raising plant with the use of the water supply spot 70 shown in the example 9. The belt conveyor (moving unit) 73 is arranged in a switchback way in this indoor plant (controlled atmosphere space), and this belt conveyor 73 makes up a loop as a whole and is driven in endless orbit by a driving apparatus 80. A part of the orbit passes through the inside of a water and nutrient supply room (liquid fertilizer supply unit) 81.

Although not shown in the figure, the supply spot 70 is arranged inside this water and nutrient supply room 81, and liquid fertilizer is dripped on each root cylinder of the basic unit 60 delivered to this water and nutrient supply room by an additional fertilizer application system 82 and a circulation pump 83 arranged outside the room. The temperature in the indoor plant is controlled by an air conditioning system 84 such that the temperature becomes favorable to promote growth of seedling. The room adjacent to the water and nutrient supply room 81 on the downstream side is a monitoring room 85, where the presence or absence of poor seedling and growing condition of seedling are observed.

The reference number 86 in the figure denotes a control room where a control system (not shown in the figure) to control delivery schedules of the basic unit 60 by the belt conveyor 73, indoor temperature adjustment, lighting to the inside of the building, indoor illumination, indoor ventilation, and the like optimally for raising of seedling is arranged. Further, the reference number 87 denotes an air shower room to remove pollutants from workers and articles that enter the plant, and the reference number 88 denotes a gate for delivery of seedling to carry in the basic unit 60 before raising the seedlings and carry out the basic unit 60 after raising the seedlings.

According to the raising plant of the above structure, since the basic unit 60 holding a number of root cylinders is automatically circulated with the use of the belt conveyor 73 inside the building that is maintained in a climatic environment favorable to raising of seedling and is appropriately supplied with liquid fertilizer on the way, it is possible to raise seedlings in a large quantity in a short period. By building such a plant, greening vast dry land becomes possible.

Example 11

Figure 14:
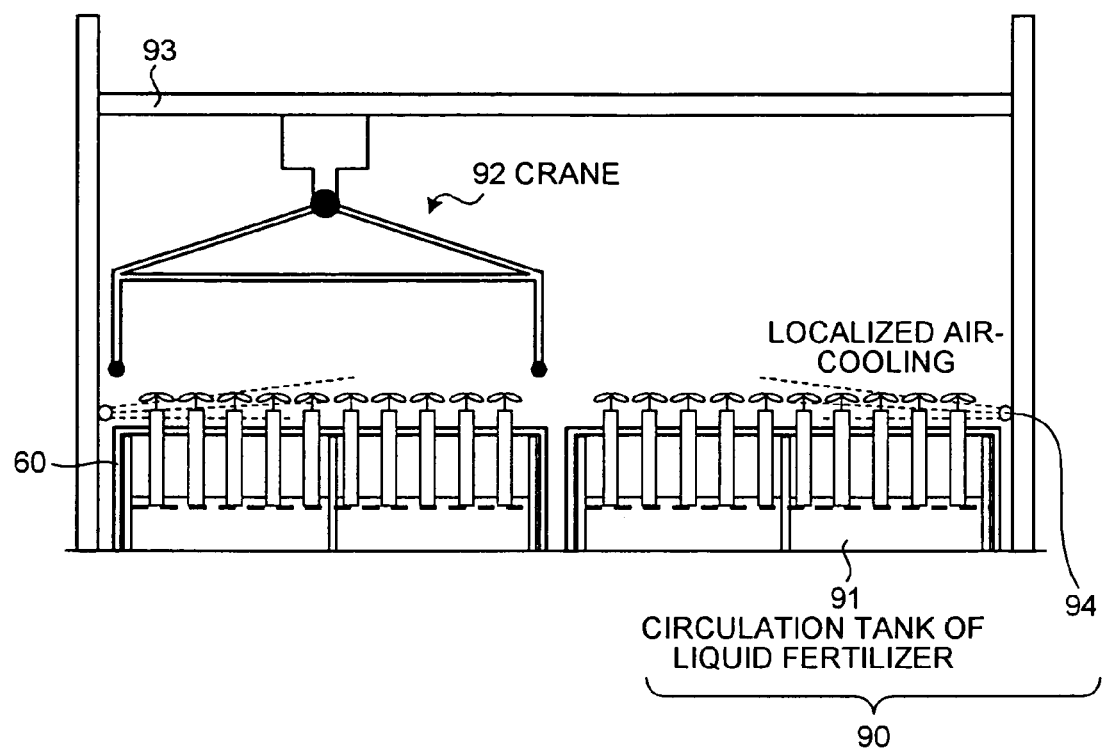
FIG. 14 is a diagram for showing another example of the liquid fertilizer supply unit suitable for carrying out the method for promoting growth of seedling of the present invention.

FIG. 14 represents another configuration of the water supply spot. This water supply spot 90 is configured by arranging a plurality of circulation tanks of liquid fertilizer 91, and a delivery line 93 to deliver the basic unit 60 by a crane 92 is provided so as to hang across these circulation tanks of liquid fertilizer 91. The water supply spot 90 of the present example 10 is placed in part of the delivery path where this delivery line 93 is laid down. Spray devices 94 are attached to the columns constructing the delivery line 93 at the places, and the surface temperature of the seedlings can be adjusted by spraying water from these spray devices 94.

To be more precise, the water supply spot 90 of the present example is thus configured of the circulation tanks of liquid fertilizer 91 and the spray devices. The crane 92 moves the basic unit 60 to the water supply spot 90, immerses the basic unit 60 in the circulation tank of liquid fertilizer 91, and leaves it there in a stationary state for a predetermined time. During this time period, the liquid fertilizer in the circulation tank of liquid fertilizer 91 is supplied from the lower ends of a number of the root cylinders held in the basic unit 60, respectively. At this time, water is sprayed from the spray devices 94 as necessary to adjust the surface temperature of the seedlings.

Example 12

Figure 15:
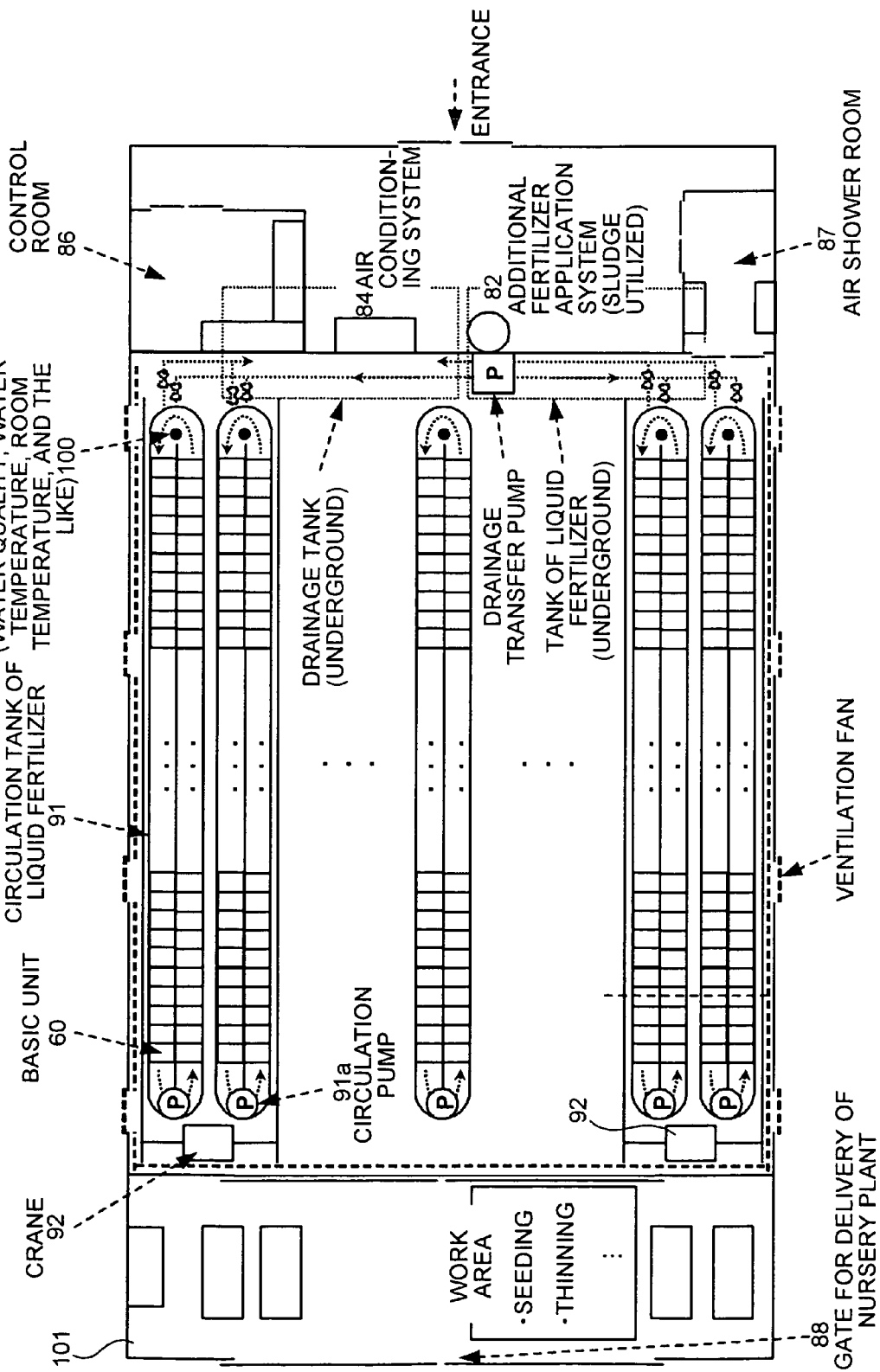
FIG. 15 is a schematic structural diagram of a plant for raising seedling adopting the liquid fertilizer supply unit shown in FIG. 14 in a plant scale.

FIG. 15 is another sketch of the entire raising plant with the use of the water supply spot 90 shown in the example 11, and like components are designated by like reference numbers as of the plant shown in example 12 to make explanation simple. A number of the cranes (moving unit) 92 are arranged in parallel in the indoor plant (controlled atmosphere space), and this crane 92 can be moved reciprocally from one end to the other end of the indoor plant. In this plant, the basic unit is immersed in the circulation tank of liquid fertilizer (liquid fertilizer supply unit) 91 temporarily and then moved by being lifted up by the crane 92 as necessary.

As described above, in this plant, a number of the basic units 60 are generally immersed in the circulation tanks of liquid fertilizer temporarily and then lifted from the liquid to allow the seedlings to grow. Therefore, the liquid fertilizer is circulated in the tanks by circulation pumps 91*a*, respectively, so as not to bring about nonuniformity in the composition of the liquid fertilizer in the tanks 91. In the figure, the reference number 100 denotes a monitoring device to monitor water quality and water temperature of the circulating liquid fertilizer, room temperature in the vicinity, and the like. Further, a work space 101 where preparation and management of seedlings such as seeding and thinning are carried out is provided between the inside of the building for raising and the gate for delivery of seedling 88.

According to the raising plant of the structure above, a number of the basic units 60 are temporarily immersed in a number of the circulation tanks of liquid fertilizer 91 arranged inside the building that is maintained in a climatic environment favorable to raising of seedling, and can be moved by the cranes 92 as necessary, and therefore, it is possible to raise seedlings in a large quantity in a short period. By building such a plant, greening vast dry land becomes possible.

Example 13

Figure 16:
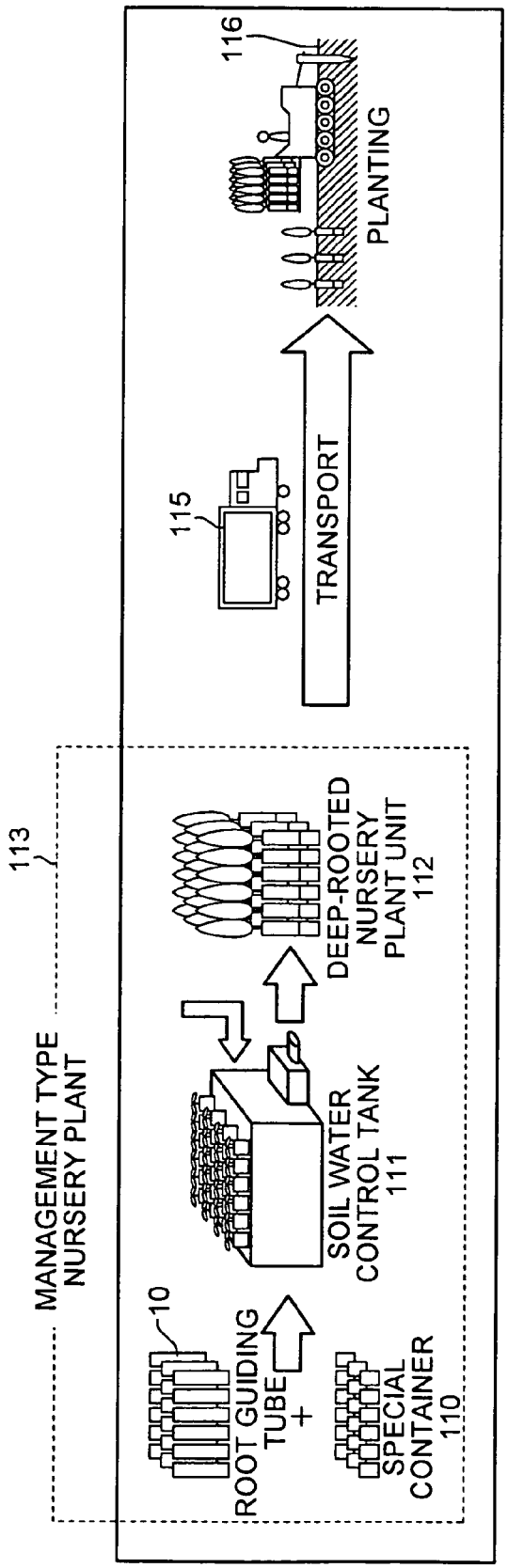
FIG. 16 is a diagram for showing an example of a series of process used in the present invention from raising of the seedling to planting of the seedling.

FIG. 16 represents an example of process from raising of seedling to planting thereof (permanent planting of seedling) in the present invention. In this process, first, manufactured root cylinders 10 are delivered to the work area in a special container 110, a seedling or seed is fixed in each root cylinder 10 in the work area, a number of these root cylinders 10 are held by the basic unit 60 or the like, and raising of root is carried out in a soil water control tank 111. The raised "seedlings having long root (referred to as "deep-rooted seedlings" in the present invention)" are made in a unit 112. The soil water control tank 111 in this case is the same as the liquid fertilizer supply system provided to the water supply spots 70 and 90, and the deep-rooted seedling unit 112 is the same as the basic unit 60 completed in raising seedlings. The foregoing process up to the completion of raising of seedling is carried out in one management type seedling 113. This plant 113 is the same as the raising plants shown in the examples 10 and 11.

The deep-rooted seedling units 112 are delivered to a planting ground 116 by a transporting means such as truck to plant the seedlings.

Example 14

Figure 17:
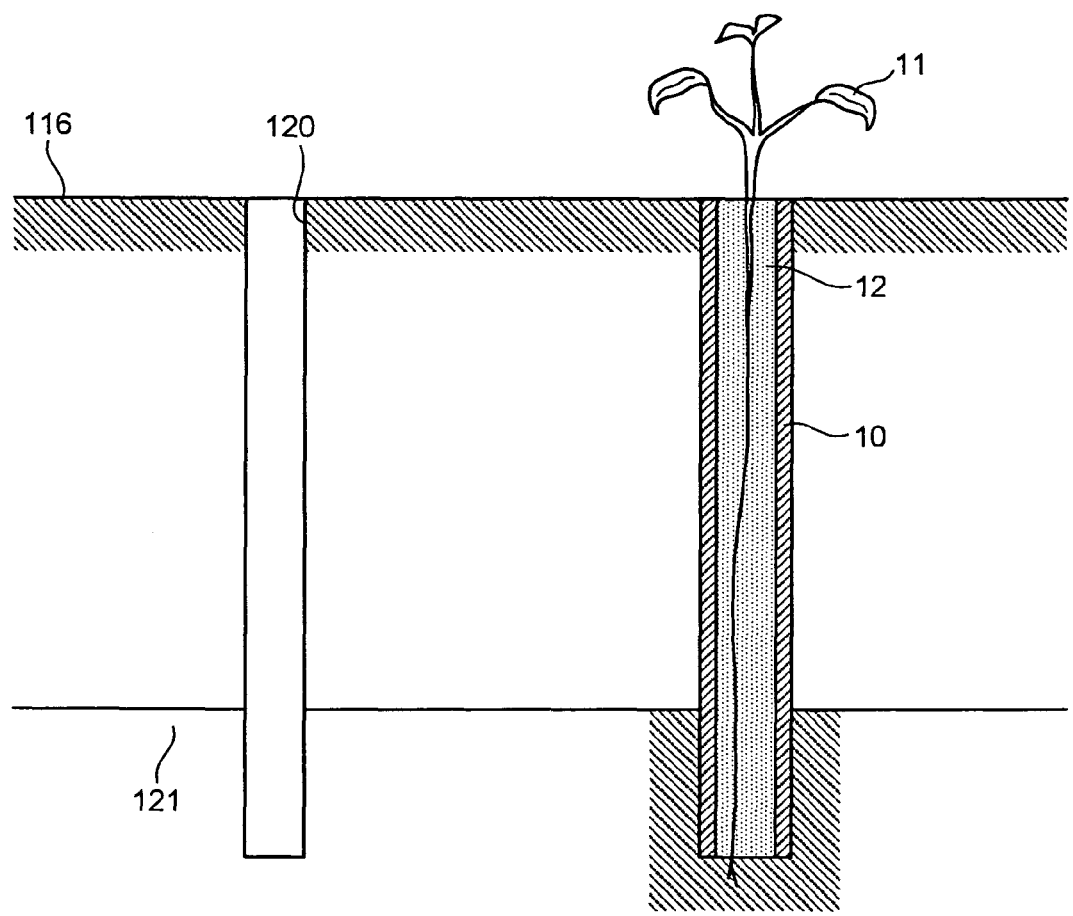
FIG. 17 is a detailed diagram for explaining a method for planting seedling in an area difficult to raise plants such as dry land of the present invention.

The present example 14 represents a method for planting seedling at planting ground of the present invention. In this method for planting seedling, as shown in FIG. 17, a vertical hole 120 having the same diameter as that of the root cylinder 10 is dug until reaching a soil layer 121 containing good quality water enough to raise plant in the ground of the planting ground 116 such as dry land, and the seedling (deep-rooted seedling) 11 having a long root obtained by raising by any one of the methods for growth described above is inserted together with the root cylinder 10 into the vertical hole 120, thereby planting the seedling in the planting ground 116. "The deep-rooted seedling 11, the root cylinder 10, and the raising medium put inside the root cylinder 10" here are provided integrally, that is, as a seedling set for planting. Owing to this, the deep-rooted seedlings 11 can be delivered while protecting them from being damaged, weakened by drying and the like. Moreover, when planting into ground, work can be carried out effectively while the deep-rooted seedling 11 is protected by the root cylinder 10.

Note that there are species having a long stem (long-stemmed seedling) in seedlings. Such a long-stemmed seedling can be sufficiently raised when the tip portion of the stem is allowed to expose from the ground surface. Therefore, when a long-stemmed seedling is used as a seedling, it is possible to push down the root cylinder 10 to an extent that allows the tip of the long-stemmed seedling to expose from the ground surface in response to a situation that the length of the root cylinder 10 is not long enough to reach the soil layer 121 containing good quality water. Owing to this, the lower end of the root cylinder 10 or the tip of the long-stemmed seedling is allowed to reach the soil layer 121.

According to this method for planting seedling, the vertical hole 120 is dug in advance, the seedling 11 is inserted into the hole together with the root cylinder 10, that is, in a mode of the seedling set for planting, and therefore, work of planting is easy and planting a number of seedlings can be carried out in a short period at the time of planting without causing damage to the long root 11a of the seedling (deep-rooted seedling) 11. Since a deepest portion of the vertical hole 120 dug is located in the soil layer 121 containing good quality water enough to raise plant, the root 11a exposing at the lower end of the root cylinder 10 inserted into the vertical hole 120 can easily absorb good quality water. In addition, particularly in an area where rainwater and the like are naturally resupplied in the soil, the water contained in this deep layer is not exhausted, and therefore, water absorption afterward proceeds smoothly, thereby the establishment of the seedling 11 can be secured.

In this method for planting seedling, the root cylinder 10 used is desirably formed of a biodegradable material. For example, as the biodegradable material, when a tube formed of a biodegradable resin is used as the root cylinder, the tube is degraded after planting seedling to become soil, and thus, the environment is not polluted, and physical inhibition in growing of plant can be avoided. The biodegradable material here means materials that are photodegraded by sunlight, materials that are oxidatively degraded depending on temperature, materials that are hydrolyzed depending on humidity, and materials that are degraded by microorganisms.

Example 15

Figure 18:
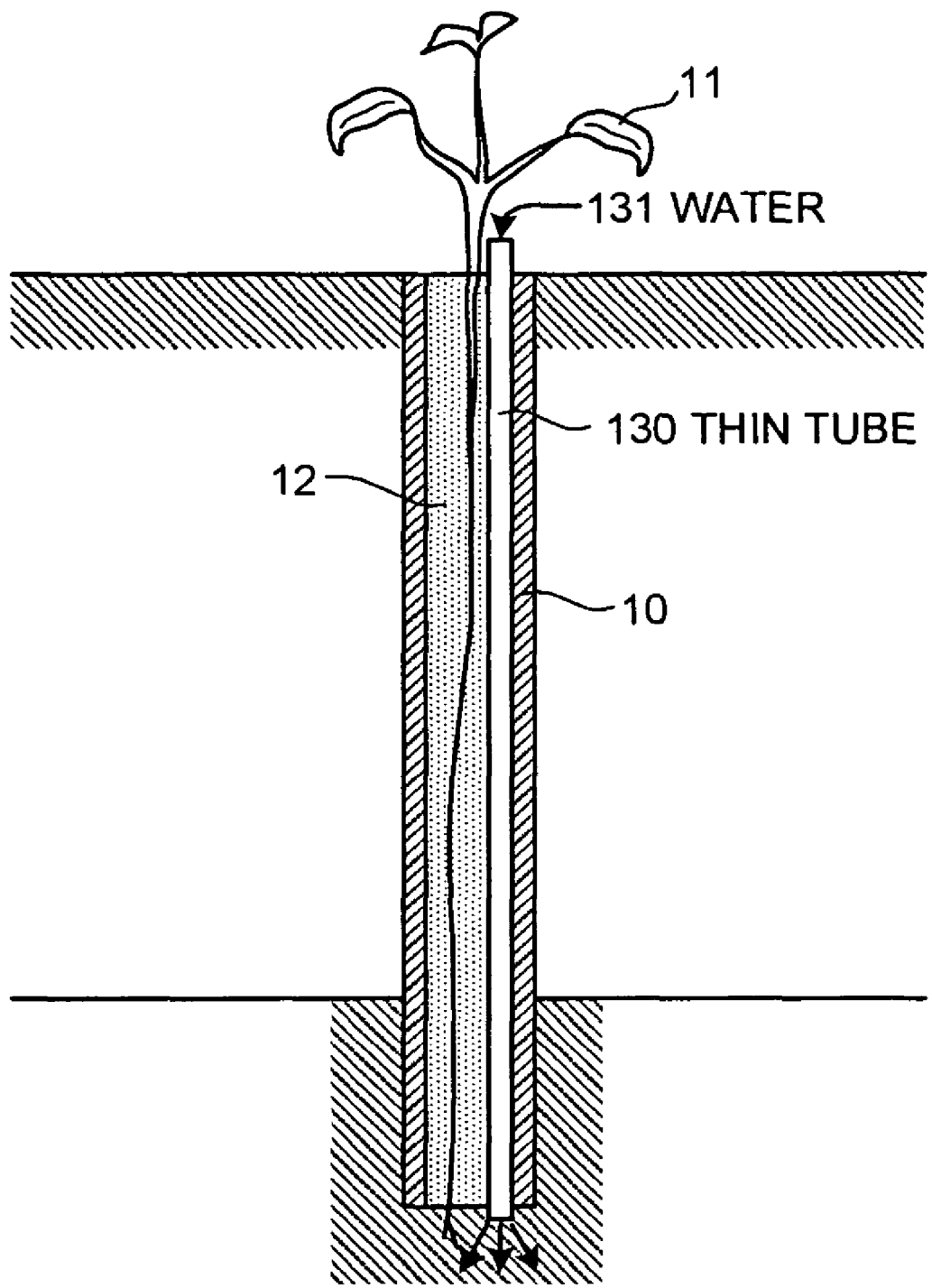
FIG. 18 is a detailed diagram for explaining a subsurface irrigation method suitable for being carried out after planting seedling in an area difficult to raise plant such as dry land.
Figure 19:
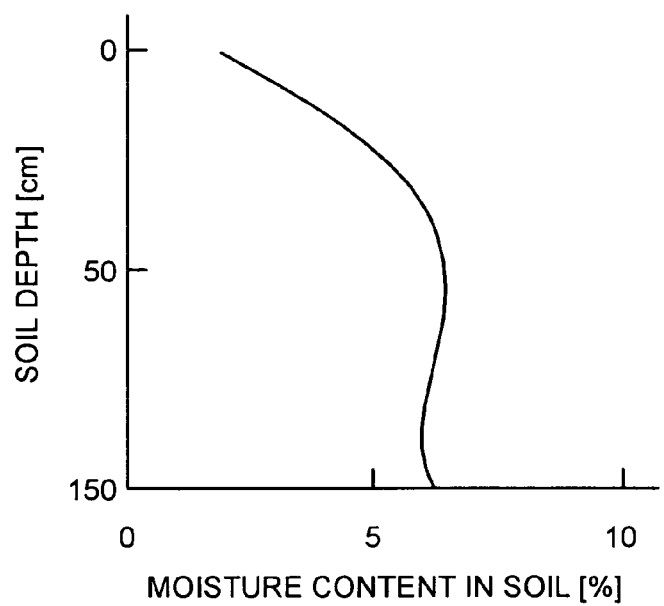
FIG. 19 is a graph for showing change of moisture content in soil in the depth direction of the ground in dry land.
Figure 20:
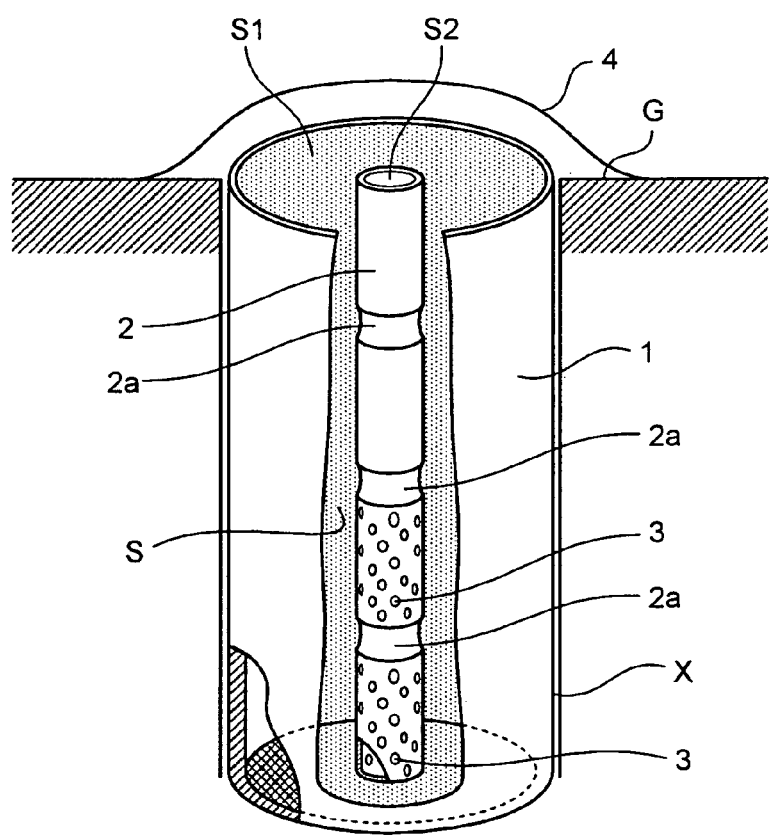
FIG. 20 is a structural diagram for showing a structure used in conventional method for planting seedling proposed for greening dry land.

As shown in the example 14, as the measures against the lack of water amount in the deep soil layer of the planting ground 116 with respect to a water amount necessary for plant growth after planting seedling in the planting ground 116, it is effective to insert a fine tube (irrigation pipe) 130 in advance at the time of manufacturing the root cylinders as shown in FIG. 18 and to supply water (liquid fertilizer) 131 from the ground surface directly to the root system portion of the deep-rooted seedling (a lowest portion of the root cylinder 10) via this fine tube 110 after transplantation.

Carrying out irrigation to the growing portion of the root (tip portion) is most effective. The reason is that the water absorption power of root is largest in the growing portion and that even if watering is carried out to the grown portion of root near the ground surface, the effect is small. By arranging the fine tube 130 serving as an irrigation pipe in the root cylinder 10, irrigation water can be directly supplied to the growing portion of the root. Such subsurface irrigation can save water compared to irrigation from the ground surface. The reason is that 60 to 70 percent of irrigated water is lost by evaporation when watering is carried out to ground surface. On the other hand, when subsurface irrigation is carried out, this evaporation is suppressed and the irrigation water is supplied to the plant, thereby enhancing the efficiency.

INDUSTRIAL APPLICABILITY

The tool for promoting growth, the system for promoting growth, the method for promoting growth, the plant for promoting growth of seedling, the seedling set for planting, and the planting method at planting ground according to the present invention can raise a seedling having a long root (deep-rooted seedling) effectively in a short period. Moreover, the long root can be delivered while protected by a tube (root cylinder), and therefore, after the long root has been allowed to grow in a place favorable to raising, the obtained seedling can be supplied even to a remote area with ease. The seedling transported to a planting area difficult to raise plant such as dry land can be planted without causing damage to the long root by being inserted into the ground together with the root cylinder. By such planting of seedling, the tip of the long root reaches a soil layer having water quality and water quantity necessary for growth of plant, thereby allowing the plant to root in a dry area even though water is not supplied actively. In other words, according to the present invention, raising deep-rooted seedlings in a short period (saving water) and mass production thereof become possible and the establishment rate can be enhanced. Therefore, greening of areas difficult to raise plants such as dry land can be carried out with ease and in a large scale, and moreover the present invention can contribute to food problems and environmental problems such as prevention of global warming in view of fixation of carbon dioxide.

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims along with their full scope of equivalents.

What is claimed is:

1. A tool for promoting growth of a seedling to obtain a seedling having a long root capable of rooting in planting ground, the tool comprising:
   a tube one end of which reaches a subsurface water-containing layer of the planting ground, the tube being made from a porous material; and
   a growing medium filled inside the tube, wherein the growing medium is adjusted to a hardness that promotes the downward growth rate of the root of the seedling fixed inside an upper opening portion of the tube, wherein
   the hardness of the growing medium is equal to or less than 1.5 Mg·m$^{-3}$, and
   an adaption layer filled with a growing medium at a hardness higher than the hardness of the growing medium filled in the tube is provided in the inside of the lower end of the tube.

2. The tool for promoting growth of seedling according to claim 1, wherein the hardness of the growing medium is equal to or lower than the soil hardness of the planting ground where the seedling is rooted after having grown.

3. The tool for promoting growth of a seedling according to claim 1, wherein the growing medium is at least one kind selected from a group consisting of soil, sand, gravel, and a substitute for soil.

4. The tool for promoting growth of a seedling according to claim 1, wherein the tube has water permeability.

5. The tool for promoting growth of a seedling according to claim 1, wherein the tube has a water holding property.

6. The tool for promoting growth of a seedling according to claim 1, wherein the tube has air permeability.

7. The tool for promoting growth of a seedling according to claim 1, wherein the subsurface water-containing layer is a water-containing layer having water quality and water quantity necessary for growth of the seedling.

8. The tool for promoting growth of a seedling according to claim 1, wherein the planting ground is soil and the growing medium constituting the adaptation layer is at least one kind selected from the group consisting of soil, sand, gravel, and a substitute for soil.

9. The tool for promoting growth of a seedling according to claim 1, wherein the tube is formed of a biodegradable material.

10. The tool for promoting growth of a seedling according to claim 1, wherein the planting ground is dry land.

11. The tool of claim 1 further comprising a seedling having a long root reaching the lower end of the tool for promoting growth that is inserted into the tool for promoting growth.

12. The tool of claim 1 further comprising:
a rack member to hold the tool for promoting growth.

13. A seedling set for planting, comprising a seedling having a long root reaching the lower end of the tool for promoting growth according to claim 12 that is inserted into the tool for promoting growth.

14. The tool of claim 1 further comprising;
a tank of liquid fertilizer to store liquid fertilizer for the seedling; and
a rack member that holds the tool in a state where the lower end of the tool for promoting growth is immersed at least temporarily in the liquid fertilizer in the tank of liquid fertilizer.

15. The system for promoting growth of a seedling according to claim 14, wherein the rack member has an up-and-down unit that moves the tool for short growth up and down with respect to the tank of liquid fertilizer.

16. The system for promoting growth of a seedling according to claim 14 further comprising an aerating unit that increases the amount of dissolved oxygen in the liquid fertilizer by forcibly dissolving air in the liquid fertilizer in the tank of liquid fertilizer.

17. The tool of claim 1 further comprising:
a rack member to hold the tool for promoting growth of a seedling; and
a liquid fertilizer supply unit that supplies liquid fertilizer in a dripping state to the upper end of each of the tools for short growth.

18. A method for promoting growth of a seedling to obtain a seedling having a long root capable of rooting in planting ground, the method comprising:
fixing a seedling inside an upper opening portion of a tube having a length to a subsurface water-containing layer of the planting ground and being made from a porous material;
filling a growing medium inside the tube at a hardness that promotes the downward growth rate of the root of the seedling; and
promoting the downward growth of the root of the seedling from the tube, thereby obtaining the seedling having the long root, wherein
the hardness of the growing medium is equal to or less than 1.5 Mg·m$^{-3}$, and
an adaption layer is provided by filling a growing medium inside the lower end of the tube at a hardness higher than the hardness of the growing medium filled in the tube.

19. The method for promoting growth of a seedling according to claim 18, wherein the hardness of the growing medium is set to a hardness equal to or lower than the soil hardness of the planting ground where the seedling is rooted after having grown.

20. The method for promoting growth of a seedling according to claim 18, wherein the growing medium is at least one kind selected from a group consisting of soil, sand, gravel, a substitute for soil is used as the growing medium.

21. The method for promoting growth of a seedling according to claim 18, wherein the tube is formed of a water permeable material for facilitating water supply to the root of the seedling.

22. The method for promoting growth of a seedling according to claim 18, wherein the tube is formed of a water retaining material for facilitating water supply to the root of the seedling.

23. The method for promoting growth of a seedling according to claim 18, wherein the tube is formed of an air permeable material for facilitating oxygen supply to the root of the seedling.

24. The method for promoting growth of a seedling according to claim 18, wherein a water-containing layer having water quality and water quantity necessary for growth of the seedling is selected for the water-containing layer.

25. The method for promoting growth of a seedling according to claim 18, wherein when the planting ground is soil, the growing medium constituting the adaptation layer is at least one kind selected from the group including soil, sand, gravel, and a substitute for soil is used as the growing medium constituting the adaptation layer.

26. The method for promoting growth of a seedling according to claim 18, wherein when the root of the seedling fixed in the upper end of the tube grows inside the tube to extend the tip of the root further below from the lower end of the tube, root pruning treatment is carried out at the tip of the root, thereby promoting development and elongation of lateral roots from the tip of the root grown inside the tube.

27. The method for promoting growth of a seedling according to claim 18, wherein the planting ground is dry land.

28. A seedling set for planting, comprising a seedling having a long root reaching the lower end of the tool for promoting growth according to claim 18 that is inserted into the tool for promoting growth.

29. A seedling set for planting, comprising a seedling having a long root reaching the lower end of the tool for promoting growth according to claim 18 that is inserted into the tool for promoting growth.

30. The tool of claim 12 further comprising:
a space around the tool where climatic environment is controllable;
and
a moving unit that moves the system for promoting growth in the space.

31. A method for planting a seedling comprising:
digging a vertical hole in a planting ground until reaching a water-containing layer having water quality and quantity necessary for growth of plant; and
burying the tool according to claim 11 in the vertical hole, thereby planting the seedling in the planting ground.

* * * * *

UNITED STATES PATENT AND TRADEMARK OFFICE
CERTIFICATE OF CORRECTION

PATENT NO. : 8,001,723 B2
APPLICATION NO. : 11/350928
DATED : August 23, 2011
INVENTOR(S) : Kazuhisa Tamura et al.

It is certified that error appears in the above-identified patent and that said Letters Patent is hereby corrected as shown below:

ON THE TITLE PAGE:

At item (73), Assignee, change:

"(73) Assignee: Mitsubishi Heavy Industries, Inc., Tokyo (JP)"
to

--(73) Assignee: Mitsubishi Heavy Industries, Ltd., Tokyo (JP)--.

Signed and Sealed this
Twenty-fourth Day of January, 2012

David J. Kappos
*Director of the United States Patent and Trademark Office*